United States Patent
Okabayashi

(10) Patent No.: US 10,111,046 B2
(45) Date of Patent: Oct. 23, 2018

(54) PORTABLE TYPE INFORMATION PROCESSING APPARATUS, INFORMATION PROCESSING SYSTEM, AND INFORMATION PROCESSING METHOD

(71) Applicant: FUJITSU LIMITED, Kawasaki-shi, Kanagawa (JP)

(72) Inventor: Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 14/941,154

(22) Filed: Nov. 13, 2015

(65) Prior Publication Data
US 2016/0073238 A1 Mar. 10, 2016

Related U.S. Application Data

(63) Continuation of application No. PCT/JP2013/063451, filed on May 14, 2013.

(51) Int. Cl.
*H04W 24/00* (2009.01)
*H04W 4/04* (2009.01)
(Continued)

(52) U.S. Cl.
CPC ....... *H04W 4/043* (2013.01); *H04W 52/0258* (2013.01); *H04W 64/00* (2013.01);
(Continued)

(58) Field of Classification Search
CPC ... H04W 4/023; H04W 4/02; H04W 72/0446; H04W 52/0254; H04W 4/025
See application file for complete search history.

(56) References Cited

U.S. PATENT DOCUMENTS

2009/0009323 A1* 1/2009 Weaver ............... G01D 21/00
340/539.26
2009/0009339 A1* 1/2009 Gorrell ............... G06Q 30/02
340/573.1
(Continued)

FOREIGN PATENT DOCUMENTS

EP 2904822 8/2015
JP 2003-264565 9/2003
(Continued)

OTHER PUBLICATIONS

EPOA—The Office Action of European Patent Application No. 13884814.8 dated Apr. 12, 2017.
(Continued)

*Primary Examiner* — Khalid Shaheed
(74) *Attorney, Agent, or Firm* — Fujitsu Patent Center

(57) ABSTRACT

A portable type information processing apparatus includes a plurality of sensing units that acquire information convertible into place information indicating a current location and detect an event which occurs in relation to the place information obtained through conversion from the information, a storage unit that stores event transition information indicating a relation between order of transitions between events and transition time periods spent on the transitions, and a control unit that obtains, as a current event, a latest event and controls an operating state of a sensing unit to detect a transition destination event of an event corresponding to the current event in the event transition information based on a relation between a transition time period spent on a transition from the event to the transition destination event in the event transition information and an elapsed time period since detection of the current event.

15 Claims, 26 Drawing Sheets

(51) Int. Cl.
*H04W 64/00* (2009.01)
*H04W 52/02* (2009.01)
*H04W 88/06* (2009.01)

(52) U.S. Cl.
CPC ......... *H04W 88/06* (2013.01); *Y02D 70/1262* (2018.01); *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | |
|---|---|---|
| 2009/0181695 A1 | 7/2009 | Wirola et al. |
| 2010/0303040 A1 | 12/2010 | Takamune |
| 2011/0071971 A1* | 3/2011 | Parks ............... G06N 5/02 706/45 |
| 2012/0239344 A1 | 9/2012 | Hasegawa |

FOREIGN PATENT DOCUMENTS

| | | |
|---|---|---|
| JP | 2005-269275 | 9/2005 |
| JP | 2006-267057 | 10/2006 |
| JP | 2006-303898 | 11/2006 |
| JP | 2007-121226 | 5/2007 |
| JP | 2008-112256 | 5/2008 |
| JP | 2008-180598 | 8/2008 |
| JP | 2008-216196 | 9/2008 |
| JP | 2008-278300 | 11/2008 |
| JP | 2009-126222 | 6/2009 |
| JP | 2009-218776 | 9/2009 |
| JP | 2010-211679 | 9/2010 |
| JP | 2010-278564 | 12/2010 |
| JP | 2012-145482 | 8/2012 |
| JP | 2012-194149 | 10/2012 |
| WO | 2012/038781 A1 | 3/2012 |
| WO | 2014/055939 A1 | 4/2014 |

OTHER PUBLICATIONS

EESR—The Extended European Search Report of European Patent Application No. 13884814.8 dated May 6, 2016.
International Search Report, mailed in connection with PCT/JP2013/063451 and dated Jun. 18, 2013 (1 page).
EPOA—Communication pursuant to Article 94(3) EPC dated Jan. 8, 2018 issued in the corresponding European application No. 13884814.8.

* cited by examiner

FIG.6

EXAMPLE OF SPECIFICATION OF EVENT HISTORY DATA

| TIME | SENSING UNIT | PLACE ID | EVENT TYPE |
|---|---|---|---|
| YYYY/MM/DD/ TT/MM/SS | GPS | PLACE X | ENTER/EXIT/STAY |
| YYYY/MM/DD/ TT/MM/SS | WI-FI | PLACE X | ENTER/EXIT/STAY |
| YYYY/MM/DD/ TT/MM/SS | BLUETOOTH | PLACE X | ENTER/EXIT/STAY |
| YYYY/MM/DD/ TT/MM/SS | MICROPHONE | PLACE X | ENTER/EXIT/STAY |
| YYYY/MM/DD/ TT/MM/SS | NFC | PLACE X | TOUCH |
| YYYY/MM/DD/ TT/MM/SS | CAMERA | PLACE X | ENTER |

FIG. 7

DIRECTED GRAPH DATA

NODE TABLE

| NODE ID | PLACE ID | SENSING UNIT | EVENT TYPE | THE NUMBER OF LOGS GENERATED |
|---|---|---|---|---|
| node0001 | Place 001 | Bluetooth | ENTER | 59 |
| node0002 | Place 001 | Bluetooth | EXIT | 59 |

FIRST ARC TABLE

| ARC ID | NODE ID (FROM) | NODE ID (TO) | NODE-TO-NODE LENGTH (ELAPSED TIME PERIOD) | THE NUMBER OF LOGS GENERATED |
|---|---|---|---|---|
| arc0001 | node0001 | node0002 | 00:12:00 | 32 |

SECOND ARC TABLE

| ARC ID | - LENGTH (ELAPSED TIME PERIOD) | LENGTH (ELAPSED TIME PERIOD) | THE NUMBER OF LOGS GENERATED |
|---|---|---|---|
| arc0001 | 00:00:00 | 00:05:00 | 13 |
| | 00:05:01 | 00:10:00 | 19 |

FIG.8

EVENT OCCURRENCE RATIO TABLE

| SENSING UNIT | EVENT OCCURRENCE RATIO | THE NUMBER OF LOGS GENERATED |
|---|---|---|
| WIFI | 0.18 | 172 |
| BLUETOOTH | 0.17 | 150 |
| GPS | 0.58 | 535 |
| MICROPHONE | 0.01 | 11 |
| NFC | 0.05 | 32 |
| CAMERA | 0.01 | 7 |

FIG.11B
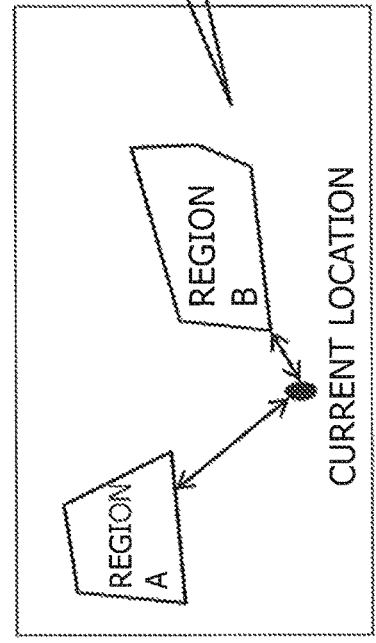
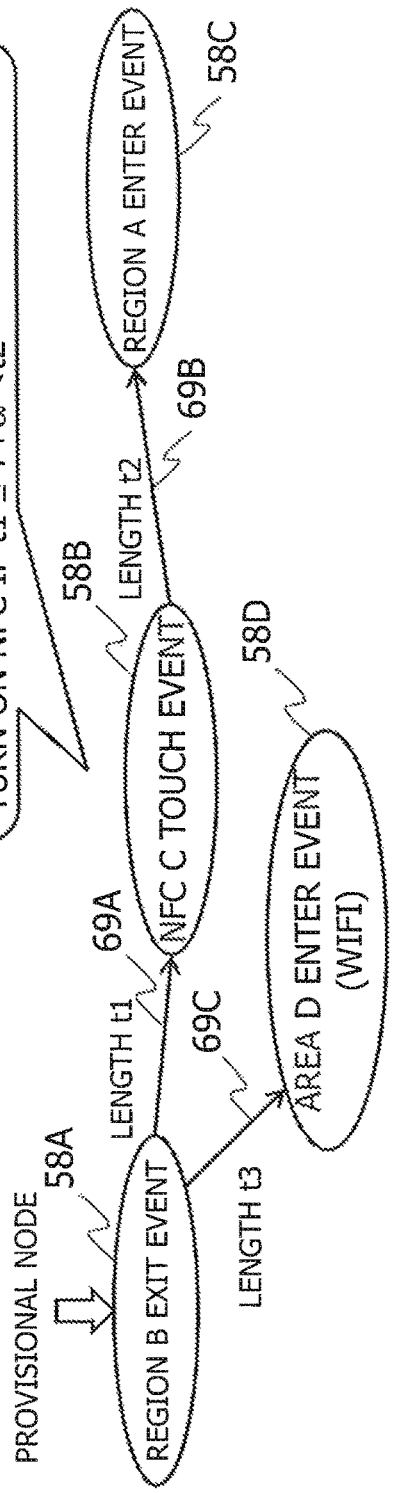

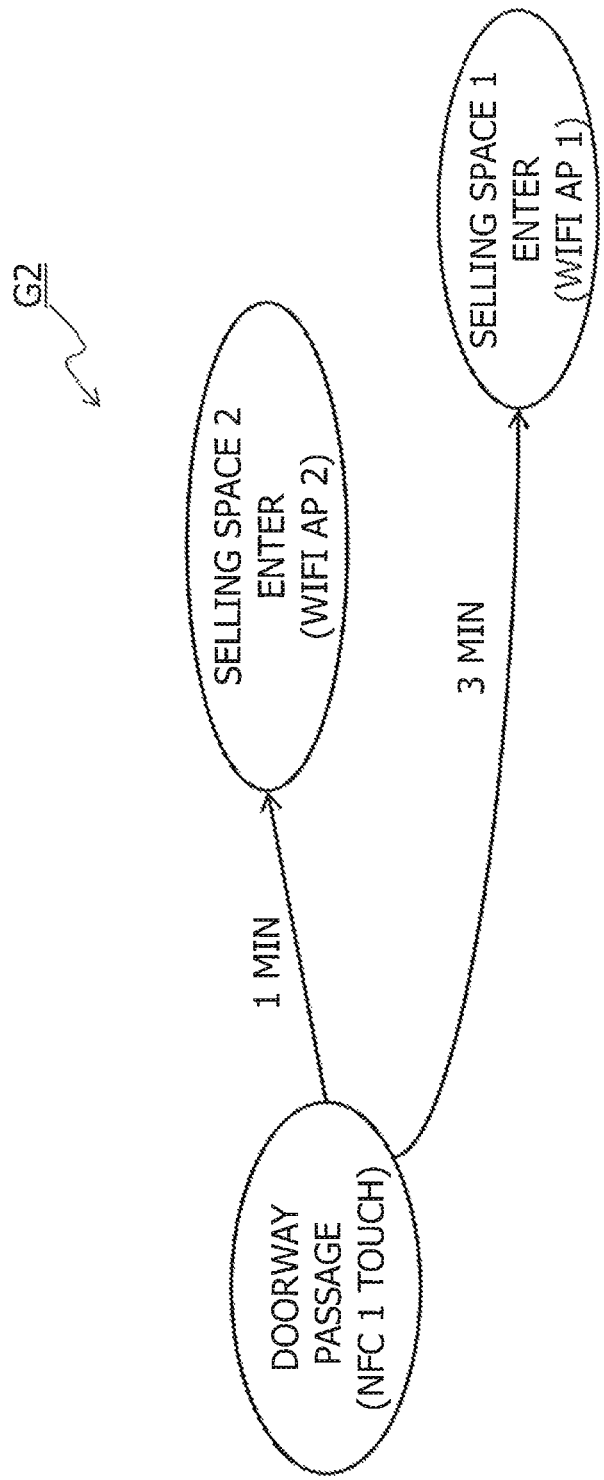

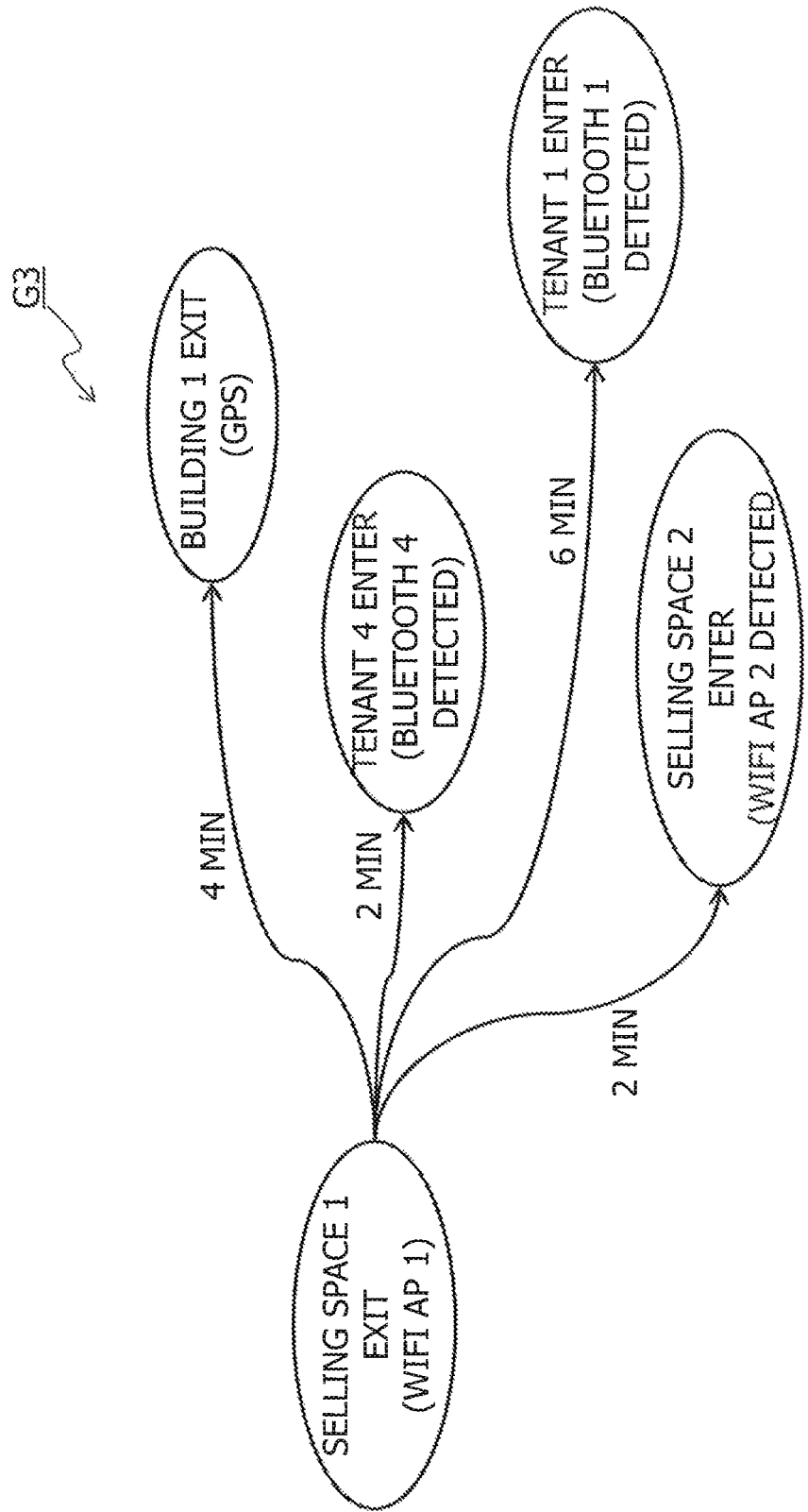

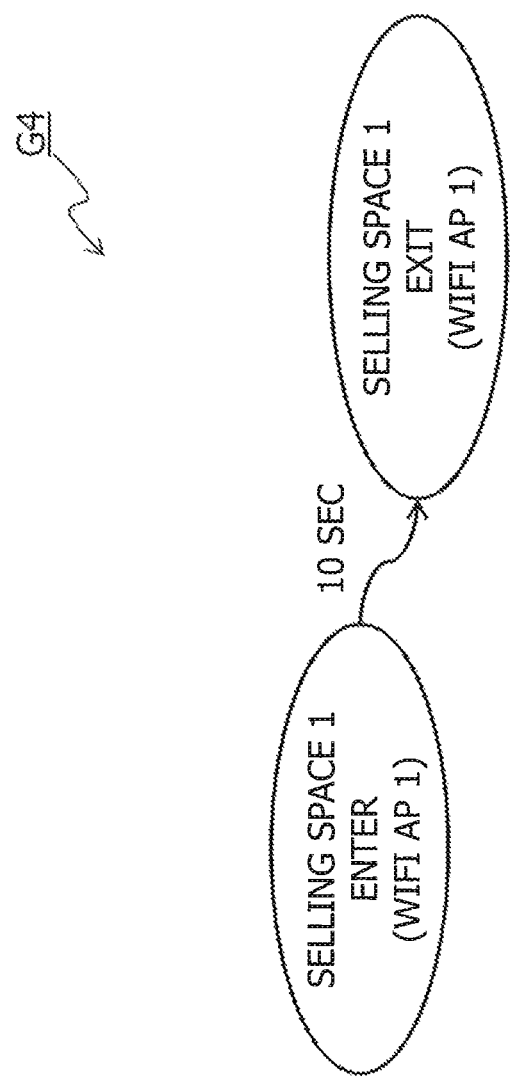

PORTABLE TYPE INFORMATION PROCESSING APPARATUS, INFORMATION PROCESSING SYSTEM, AND INFORMATION PROCESSING METHOD

CROSS-REFERENCE TO RELATED APPLICATION

This application is a continuation of International Application PCT/JP2013/063451, filed on May 14, 2013, and designated the U.S., the entire contents of which are incorporated herein by reference.

FIELD

The present invention relates to a portable type information processing apparatus for controlling a sensing unit, an information processing system, and an information processing method.

BACKGROUND

FIG. 1 is a diagram illustrating an example of a place determination sensing unit. Placement determination sensing units are broadly divided into ones which acquire absolute coordinates, ones which acquire presence within a range of detection of a device, and ones (passage type ones) which acquire passage through an installation location of a device.

A sensing unit that acquires absolute coordinates is, for example, a GPS receiver. A GPS receiver receives a signal from a GPS satellite, measures a latitude and a longitude at which the GPS receiver is currently located, compares the latitude and the longitude with map information, and detects an entry into and an exit from a place. A latitude and a longitude are also called absolute coordinates.

A sensing unit that acquires presence within a range of detection of a device is, for example, a Wi-Fi (Wireless Fidelity) device, a Bluetooth(R) device, and a microphone. A Wi-Fi device detects, for example, based on a SSID (Service Set Identifier) which is a piece of identification information of a Wi-Fi access point from and RSSI (Received Signal Strength Indication) information indicating field strength from a received radio wave, an entry into or an exit from a range of detection of an access point with the SSID. A Bluetooth device detects an entry into or an exit from a range of detection of an installed Bluetooth® device with an ID by, for example, detecting the ID of the Bluetooth device from a received radio wave. A microphone detects an entry into or an exit from a range of detection of a device with an ID by, for example, detecting the ID from a sound wave signal outside an audible range among picked up sound wave signals.

A sensing unit that acquires passage through an installation location of a device is, for example, an NFC (Near Field Communication) device and a camera. Examples of an NFC device include an NFC reader and an IC card. For example, a mobile terminal including an IC card as an NFC device detects passage through an installation location of an NFC reader by detecting a touch on the NFC reader. A camera detects passage through a predetermined location by, for example, recognizing a marker, such as a QR Code®, installed at the predetermined location from a captured image.

PATENT DOCUMENT

[Patent document 1] Japanese Patent Laid-Open No. 2003-264565

[Patent document 2] Japanese Patent Laid-Open No. 2010-278564

[Patent document 3] Japanese Patent Laid-Open No. 2010-211679

[Patent document 4] Japanese Patent Laid-Open No. 2006-303898

However, constant operation of a plurality of sensing units causes the problem of an increase in power consumed by a mobile terminal.

SUMMARY

One aspect of the present invention is a portable type information processing apparatus including a plurality of sensing units that acquire information convertible into place information indicating a current location of the portable type information processing apparatus and detect an event which occurs in relation to the place information obtained through conversion from the information, a storage unit that stores event transition information indicating a relation between order of transitions between events acquired by the plurality of sensing units and transition time periods spent on the transitions, and a control unit that obtains, as a current event, a latest event detected by any one of the plurality of sensing units and controls an operating status of a sensing unit to detect a transition destination event of an event corresponding to the current event in the event transition information based on a relation between a transition time period spent on a transition from the event corresponding to the current event to the transition destination event in the event transition information and an elapsed time period since detection of the current event.

The object and advantages of the invention will be realized and attained by means of the elements and combinations particularly pointed out in the claims.

It is to be understood that both the foregoing general description and the following detailed description are exemplary and explanatory only and are not restrictive of the invention.

BRIEF DESCRIPTION OF DRAWINGS

FIG. 6 is an example of a diagram illustrating the specification of a piece of event history data;

FIG. 7 is an example of a diagram illustrating data included in a directed graph data holding unit;

FIG. 8 is an example of an event occurrence ratio table held in an event occurrence ratio holding unit of each mobile terminal;

FIG. 11B is an example of a diagram illustrating the provisional node determination process utilizing absolute coordinates;

FIG. 20B is an example of a diagram illustrating a directed graph to be created in sensing control according to the first embodiment;

FIG. 20C is an example of a diagram illustrating a directed graph to be created in sensing control according to the first embodiment;

FIG. 20D is an example of a diagram illustrating a directed graph to be created in sensing control according to the first embodiment.

DESCRIPTION OF EMBODIMENTS

An embodiment of the present invention will be described below with reference to the drawings. A configuration of the embodiment below is merely illustrative, and the present invention is not limited to the configuration of the embodiment.

<First Embodiment>

Figure 1:
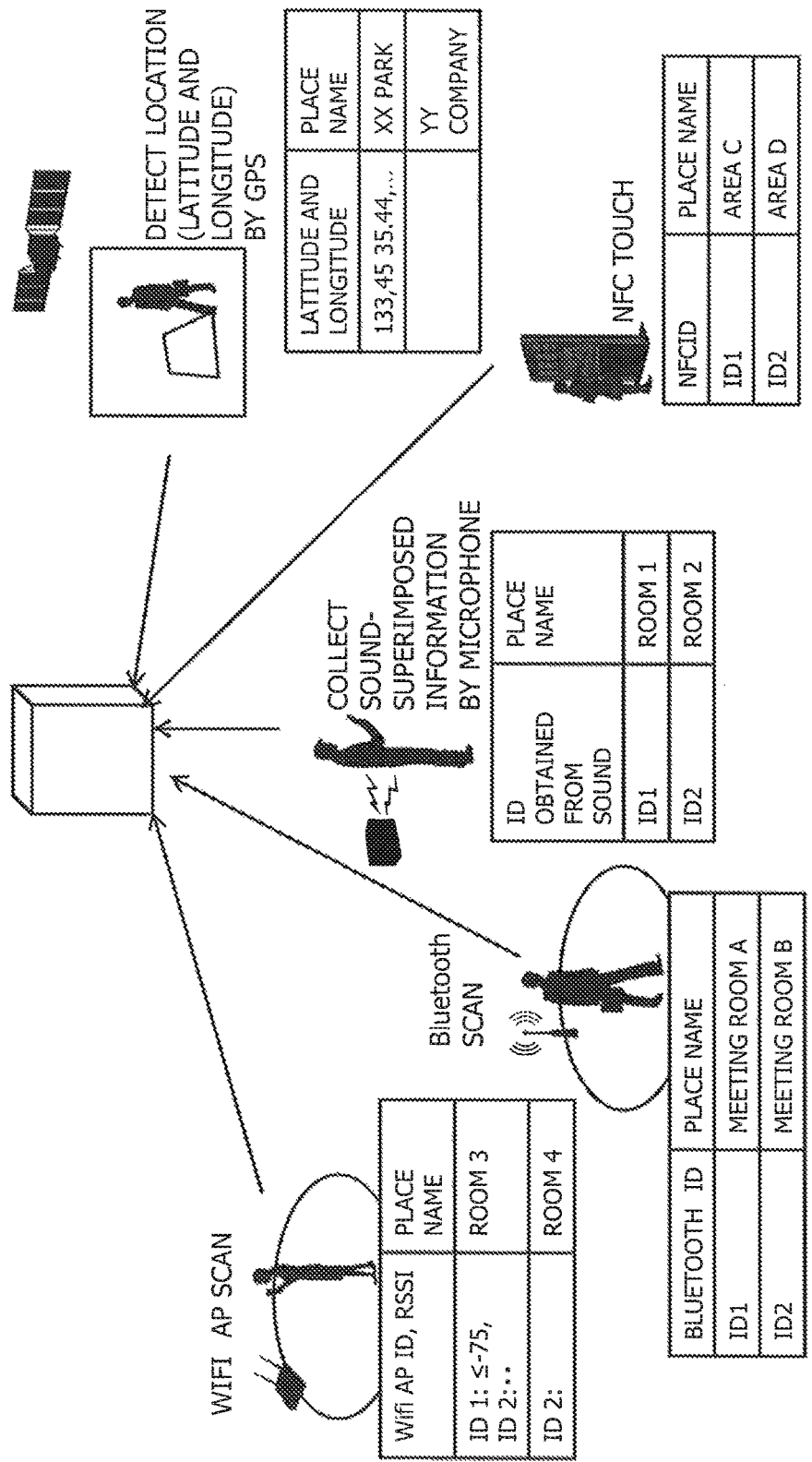
FIG. 1 is an example of a diagram illustrating a place determination sensing unit.
Figure 2:
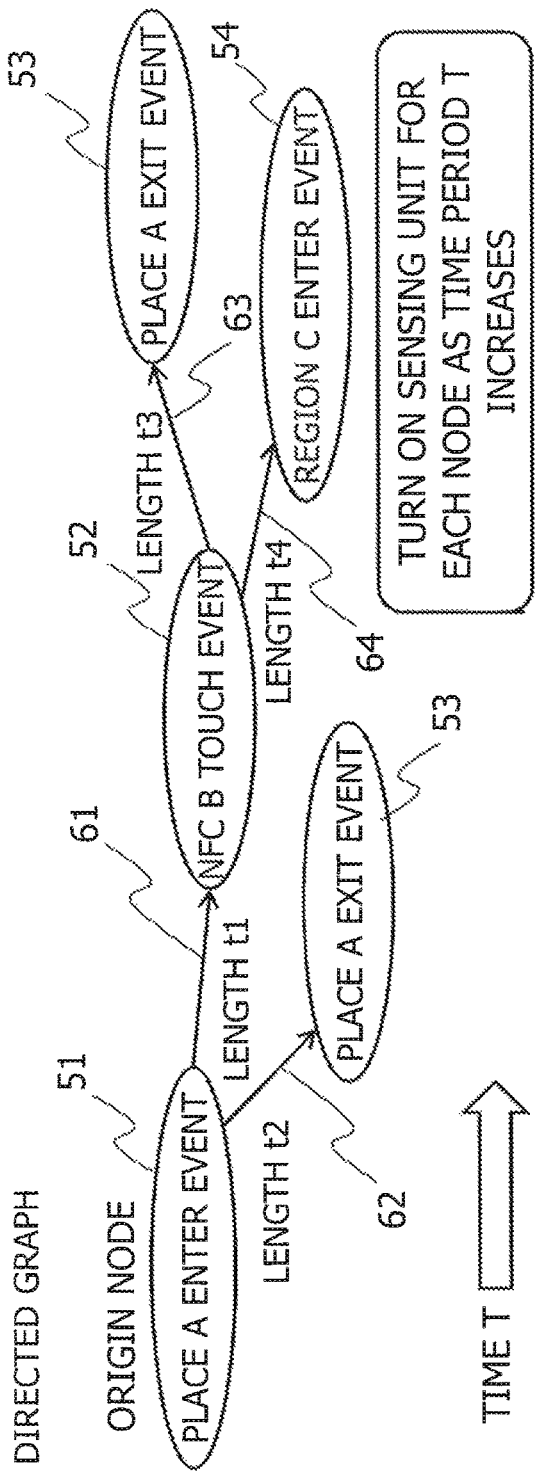
FIG. 2 is an example of a diagram illustrating processing by a portable type information processing apparatus according to a first embodiment.

FIG. 2 is an example of a diagram illustrating processing by a portable type information processing apparatus according to a first embodiment. In the first embodiment, the portable type information processing apparatus includes a plurality of sensing units different in type. For example, the portable type information processing apparatus includes, as sensing units, a GPS reception module, an NFC module, a Wi-Fi module, a microphone, a camera, and the like.

Sensing is to detect, for example, a GPS signal, a radio wave of a predetermined frequency, a sound wave signal of a predetermined frequency, a predetermined marker, or the like from predetermined means. Examples of the predetermined means include a GPS satellite, a Wi-Fi access point, an NFC reader, and an identification marker. Each sensing unit of the portable type information processing apparatus acquires, for example, absolute coordinates, the SSID of a Wi-Fi access point, the ID of an NFC reader, the ID of an identification marker, or the like by performing sensing. The sensing unit holds pieces of place information linked to such pieces of information to be obtained through sensing and acquires a piece of place information indicating a current location through sensing. Examples of the piece of place information indicating the current location include a park on a map, a region, such as a site, a range of detection of a device, and an installation place. That is, in the first embodiment, sensing is to acquire a piece of information convertible into a piece of place information indicating a current location from the predetermined means.

Each sensing unit detects occurrence of an event related to a piece of place information linked to a piece of information obtained through sensing according to a sensing condition. An event related to a piece of place information is, for example, to enter into, exit from, or stay in a predetermined place, region, or geographical range. In the first embodiment, each event is distinguished by the type, the place, and the type of a sensing unit as a detector.

Note that events are detected by sensing units and that events to be detected differ according to the type and specification of a sensing unit. For example, a sensing unit that acquires absolute coordinates and a sensing unit that acquires presence within a range of detection of a device detect events of the types: an entry, an exit, and a stay for a predetermined place. For example, a passage type sensing unit detects passage through a predetermined place, i.e., a stay event in the predetermined place. Note that events to be detected are not limited to these.

An event type name is not limited to enter, exit, or stay. Event type names differ from one sensing unit to another. For example, in the example illustrated in FIG. 2, an NFC as a passage type sensing unit calls a stay event for an installation place of NFC B a touch event. Note that although event type names differ from one sensing unit to another, it is assumed that events are classified into any one of the types: enter, exit, and stay, in the first embodiment.

The portable type information processing apparatus includes a storage unit that stores a piece of event transition information which is produced from pieces of log information on events detected by sensing units. A piece of event transition information is a piece of information indicating a relation between the order of transitions between events acquired by sensing units and transition time periods between the events. The portable type information processing apparatus regards a latest event as a current event and controls, based on a relation between a transition time period from an event corresponding to the current event to a transition destination event in the piece of event transition information and an elapsed time period since detection of the latest event, the operating status of a sensing unit which has detected the transition destination event.

More specifically, the portable type information processing apparatus obtains an event transition with the latest event as an origin. In the first embodiment, the event transition is expressed using a directed graph. The portable type information processing apparatus creates a directed graph with the latest event as an origin while expressing an event as a node, an event transition as an arc, and an event occurrence interval as an arc length.

For example, in the example illustrated in FIG. 2, pieces of history data include histories of occurrence of an NFC B touch event after a lapse of t1 since occurrence of a place A enter event and occurrence of a place A exit event after a lapse of t2 hours since the occurrence of the place A enter event. That is, it is expected, based on the pieces of history data, that the NFC B touch event will occur after a lapse of t1 since occurrence of the place A enter event and that the place A exit event will occur after a lapse of t2 since the occurrence.

Thus, if a latest event is the place A enter event, the place A enter event, the NFC B touch event, and the place A exit event are set as an origin node 51, a node 52, and a node 53, respectively. The origin node 51 and the node 52 are connected by an arc of a length t1 heading from the origin node 51 toward the node 52. The origin node 51 and the node 53 are connected by an arc of a length t2 heading from the origin node 51 toward the node 53.

Occurrence of the place A exit event and occurrence of a region C enter event after the NFC B touch event are also expected from the pieces of history data. As described above, the node 53, a node 54, and arcs 63 and 64 are added to the directed graph. In this manner, a directed graph is created from pieces of history data.

The portable type information processing apparatus determines the operating status of a sensing unit that detects an event as each node based on a relation between an elapsed time period T since occurrence of the latest event and the sum of arc lengths from the origin node for the each node. For example, if t2<t1 in FIG. 2, when an elapsed time period T since the origin node 51 becomes equal to or greater than the length t2 of an arc 62 connecting the origin node 51 and the node 53, the portable type information processing apparatus selects the node 53 and turns on a sensing unit corresponding to the node 53. When time passes without detection of event occurrence, and the elapsed time period T becomes equal to or greater than the length t1(>t2) of an arc 61 connecting the origin node 51 and the node 52, the portable type information processing apparatus turns on respective sensing units corresponding to the node 52 and the node 53.

That is, in the example illustrated in FIG. 2, the portable type information processing apparatus keeps all sensing units off while 0<the elapsed time period T <t2. The portable type information processing apparatus keeps the sensing unit corresponding to the node 53 on and the other sensing units off while t2≤the elapsed time period T<t1. The portable type information processing apparatus keeps the sensing units corresponding to the node 53 and the node 52 on and the other sensing units off while t1≤the elapsed time period T<t1+t4. Note that control of the operating status of a sensing unit is not limited to turn-on or turn-off of the sensing unit and includes, for example, operation interval control.

As described above, the portable type information processing apparatus turns on a sensing unit for an event which may occur next and turns off the other sensing units. This reduces the number of sensing units running in parallel and reduces consumed power.

Note that not every directed graph is created in the form as illustrated in FIG. 2 in the portable type information processing apparatus. For example, the information processing apparatus may separately define nodes and arcs, list pieces of identification information of the nodes and arcs in order of transition, and treat the list as a directed graph. Although the words node and arc are used in the description below, definitions as a node and an arc need not be given in the portable type information processing apparatus. For example, an event may be defined as an event, and an arc may be defined as a transition from a transition source event to a transition destination event.

<System Configuration>

Figure 3:
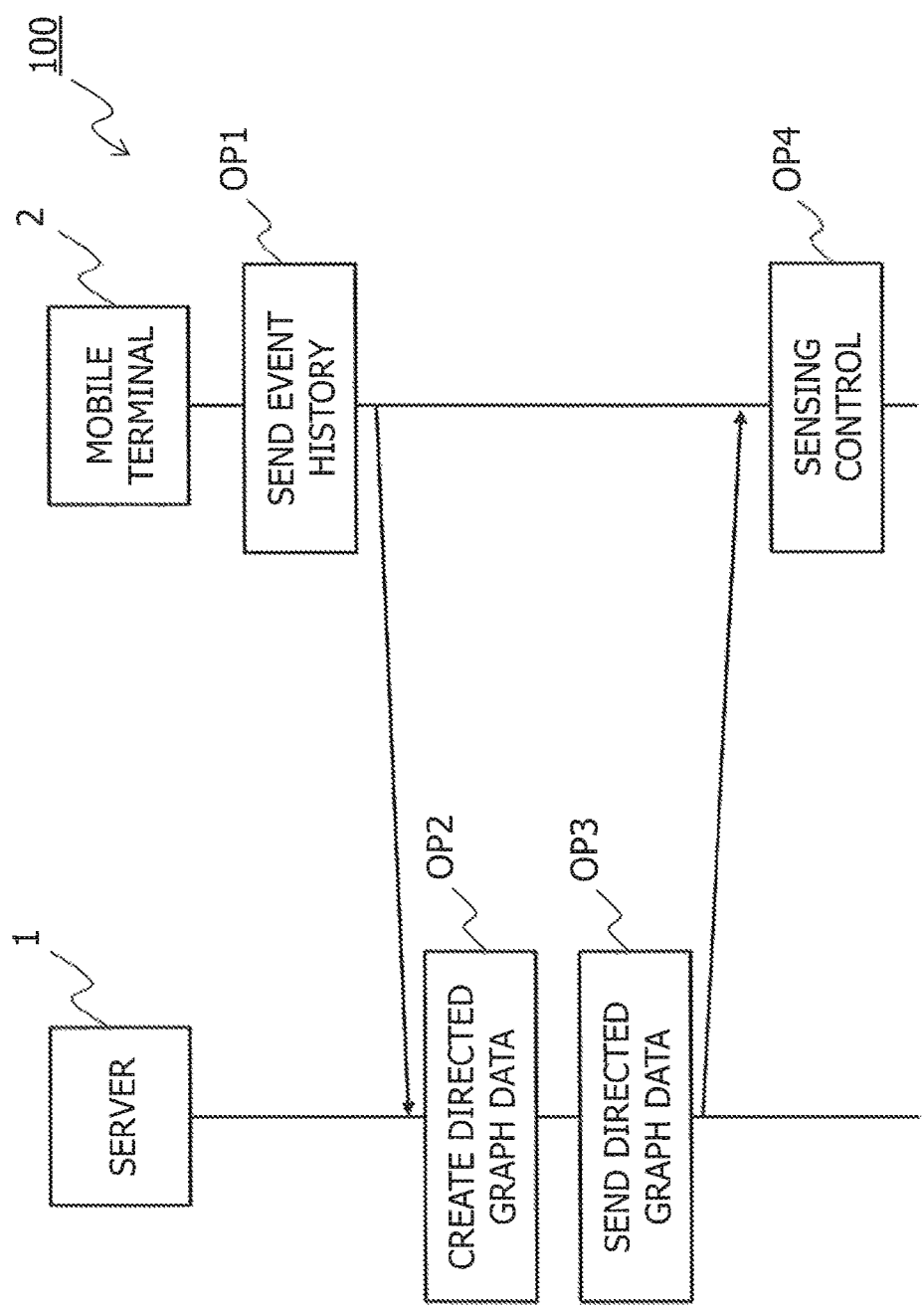
FIG. 3 is an example of a diagram illustrating a configuration of a sensing control system according to the first embodiment and a flow of processing in the sensing control system.

FIG. 3 is an example of a diagram illustrating the configuration of a sensing control system 100 according to the first embodiment and the flow of processing in the sensing control system 100. The sensing control system 100 includes a server 1 and a plurality of mobile terminals 2. Note that one mobile terminal 2 is illustrated in FIG. 3, for the sake of convenience. The mobile terminal 2 is an example of a "portable type information processing apparatus".

In OP1, each mobile terminal 2 sends a piece of event history data to the server 1. In OP2, the server 1 creates or updates a piece of directed graph data from or with the pieces of event history data received from the mobile terminals 2. The details of the piece of directed graph data will be described later. In OP3, the server 1 sends the piece of directed graph data to the mobile terminals 2.

The processes in OP1 to OP3 are each executed with timing for a corresponding one of the server 1 and the mobile terminals 2, such as with predetermined frequency. The predetermined frequency is, for example, a frequency per day (e.g., once a day), a frequency per week (e.g., once a week), or a frequency per month (e.g., once a month) and is set by a system administrator.

In OP4, each mobile terminal 2 creates a directed graph with a latest event as an origin using the piece of directed graph data received from the server 1 and controls a sensing unit based on the directed graph.

Figure 4:
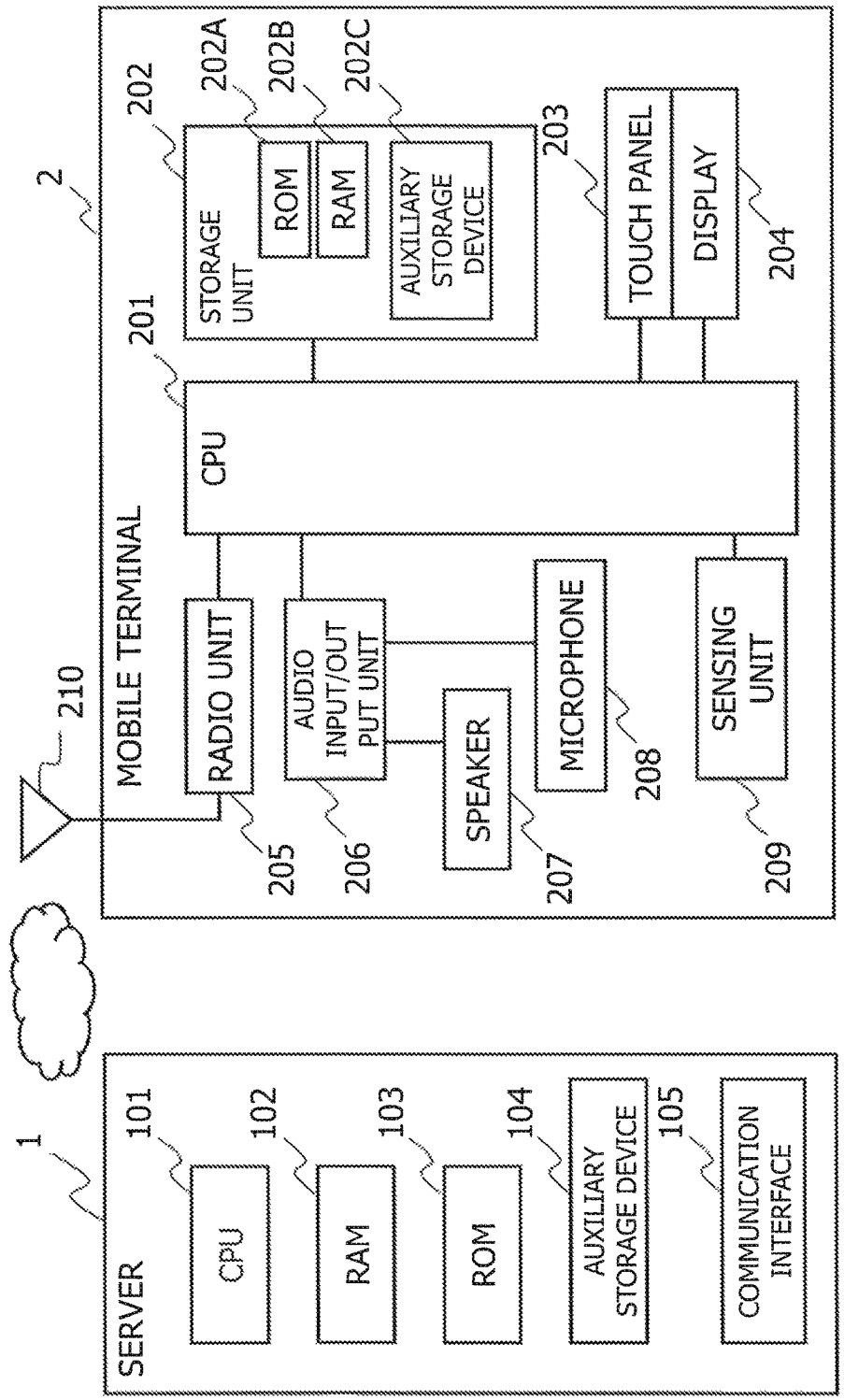
FIG. 4 is an example of a diagram illustrating hardware configurations of a server and a mobile terminal.

FIG. 4 is an example of a diagram illustrating the hardware configurations of the server 1 and the mobile terminal 2. The server 1 is an information processing apparatus and is, for example, a dedicated computer or a general-purpose computer, such as a personal computer (PC). The server 1 includes a CPU (Central Processing Unit) 101, a RAM (Random Access Memory) 102, a ROM (Read Only Memory) 103, an auxiliary storage device 104, and a communication interface 105, which are electrically connected to each other.

The communication interface 105 is, for example, an interface that connects to a LAN by wire or by radio. The server 1 connects to an external network via, for example, a LAN. The server 1 receives an event history from the mobile terminal 2 and sends a piece of directed graph data to the mobile terminal 2. The communication interface 105 is, for example, a NIC (Network Interface Card) or a wireless LAN (Local Area Network).

The RAM 102 and the ROM 103 are used as main storage devices. The RAM 102 provides a storage region, onto which a program stored in the auxiliary storage device 104 is to be loaded, and a work region to the CPU 101, and is used as buffers. The RAM 102 and the ROM 103 are, for example, semiconductor memories.

The auxiliary storage device 104 is, for example, a non-volatile storage device, such as an EPROM (Erasable Programmable ROM) or an HDD (Hard Disk Drive). A removable medium which is detachably mounted on the server 1 may also be used as the auxiliary storage device 104. Examples of a removable medium include a memory card using an EEPROM or the like, a CD (Compact Disc), a DVD (Digital Versatile Disc), and a BD (Blu-ray® Disc). The auxiliary storage device 104 as a removable medium and the auxiliary storage device 104 that is not of a removable type can also be used in combination.

The auxiliary storage device 104 stores, for example, an operating system (OS), a directed graph data creation program, and various other application programs. The directed graph data creation program is a program for creating and updating a piece of directed graph data from pieces of event history data received from the mobile terminals 2. A piece of directed graph data is a piece of data for creating a directed graph and is a piece of information in which nodes and arcs are defined.

The CPU 101 executes various processes by loading the OS, the directed graph data creation program, and the various other application programs stored in the auxiliary storage device 104 onto the RAM 102 and the ROM 103 and executing the programs. The number of CPUs 101 is not limited to one, and a plurality of CPUs 101 may be provided.

The hardware configuration of the server 1 is not limited to the example illustrated in FIG. 4, and omission, replacement, and addition of a constituent element may be appropriately performed. For example, the server 1 may include an input device, such as a keyboard or a pointing device, and an output device, such as a display or a printer.

The mobile terminal 2 is a portable type information processing apparatus and is, for example, a smartphone, a mobile phone handset, a tablet terminal, a car navigation system, a portable type game apparatus, or the like. In the first embodiment, the mobile terminal 2 is assumed to be a smartphone. The mobile terminal 2 includes a CPU 201, a storage unit 202, a touch panel 203, a display 204, a radio unit 205, an audio input/output unit 206, a speaker 207, a microphone 208, a sensing unit 209, and an antenna 210, which are electrically connected to each other.

The storage unit 202 includes a ROM 202A, a RAM 202B, and an auxiliary storage device 202C. The ROM 202A and the RAM 202B are used as main storage devices. The RAM 202B provides a storage region, onto which a program stored in the auxiliary storage device 202C is to be loaded, and a work area to the CPU 201, and is used as buffers. The ROM 202A and the RAM 202B are, for example, semiconductor memories.

The auxiliary storage device 202C is, for example, a non-volatile storage device, such as an EPROM. A removable medium which is detachably mounted on the mobile terminal 2 may also be used as the auxiliary storage device 202C. Examples of a removable medium include a memory card using an EEPROM or the like. The auxiliary storage device 202C as a removable medium and the auxiliary storage device 202C that is not of a removable type can also be used in combination.

The auxiliary storage device 202C stores, for example, an OS, a sensing control program, and various other application programs. The sensing control program is a program for controlling the sensing unit 209. The sensing control program is an example of an "information processing program".

The CPU 201 executes various processes by loading the OS, the sensing control program, and the various other application programs stored in the auxiliary storage device 202C onto the ROM 202A and the RAM 202B and executing the programs. The number of CPUs 201 is not limited to one, and a plurality of CPUs 201 may be provided.

The touch panel 203 is one of position input devices and inputs coordinates of a contact position of a finger corresponding to a screen of the display 204. The touch panel 203 may be of any one of a resistive film type, a surface acoustic wave type, an infrared type, an electromagnetic induction type, a capacitance type, and the like.

The display 204 is, for example, a liquid crystal display (LCD). The display 204 displays a piece of screen data in accordance with a signal input from the CPU 201.

The radio unit 205 is connected to the antenna 210. The radio unit 205 converts a radio signal received through the antenna 210 into an electrical signal and outputs the electrical signal to the CPU 201, and converts an electrical signal input from the CPU 201 into a radio signal and transmits the radio signal through the antenna 210. The radio unit 205 is, for example, an electronic circuit supporting any one or ones of 3G mobile communication system, Wi-Fi, and LTE (Long Term Evolution).

The audio input/output unit 206 is connected to the speaker 207 as a sound output device and the microphone 208 as a sound input device. The audio input/output unit 206 converts a sound signal input from the microphone 208 into an electrical signal and outputs the electrical signal to the CPU 201, and converts an electrical signal input from the CPU 201 into a sound signal and outputs the sound signal to the speaker 207.

The sensing unit 209 is a sensor module that performs sensing, and a plurality of sensing units 209 are provided. The sensing units 209 include a GPS reception module, a Wi-Fi module, a Bluetooth(R) module, an NFC module, a microphone, a camera, and the like. In the first embodiment, the NFC module includes an IC card. Note that the Wi-Fi module as the sensing unit 209 may be a Wi-Fi module included in the radio unit 205. The microphone as the sensing unit 209 and the microphone 208 may be one and the same or may be different from each other.

The hardware configuration of the mobile terminal 2 is not limited to the example illustrated in FIG. 4, and omission, replacement, and addition of a constituent element may be appropriately performed. For example, the mobile terminal 2 includes a battery in addition to the hardware configuration illustrated in FIG. 4.

Figure 5:
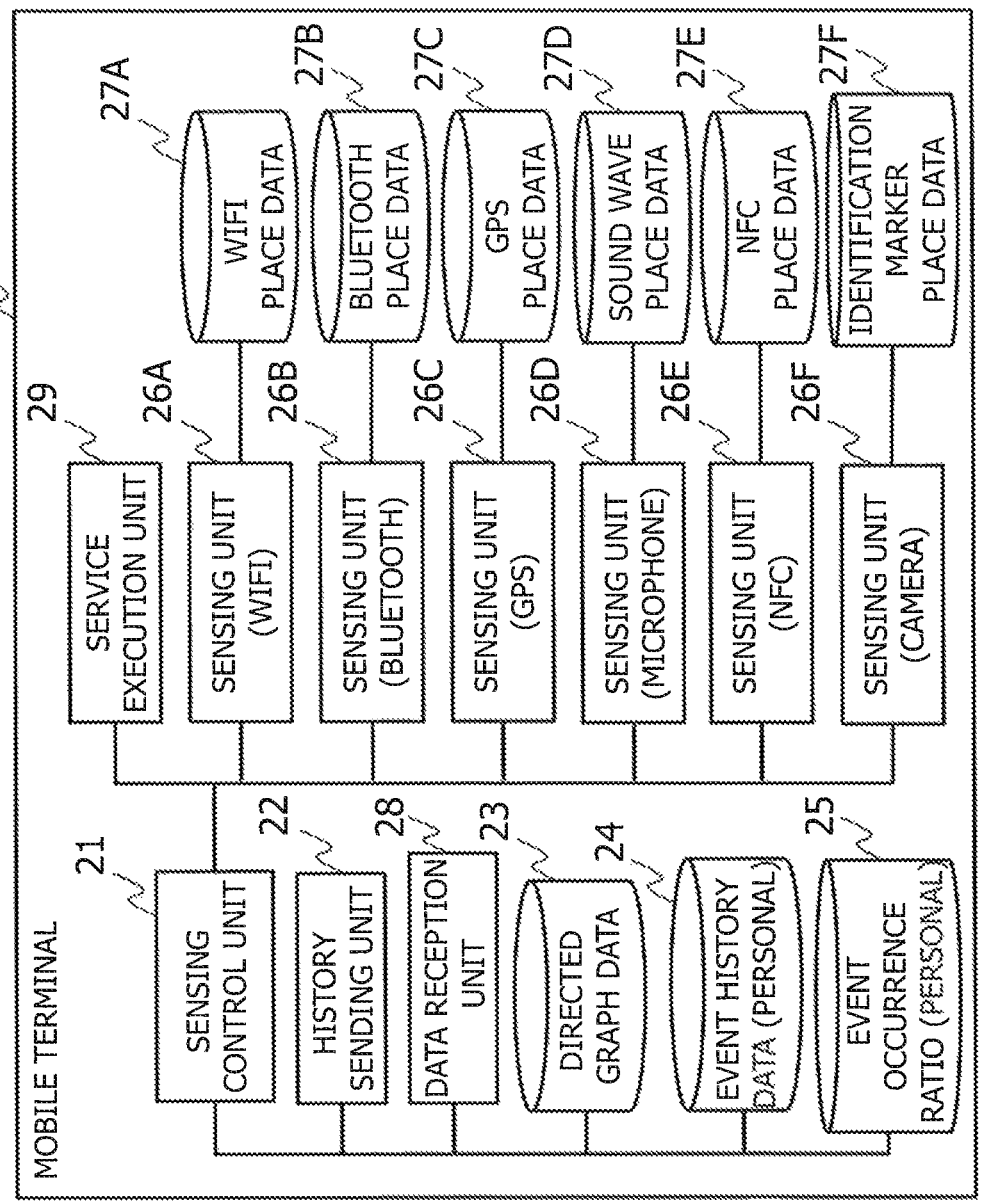
FIG. 5 is an example of a diagram illustrating of functional blocks of the server and the mobile terminal according to the first embodiment.

FIG. 5 is an example of a diagram illustrating functional blocks of the server 1 and the mobile terminal 2 according to the first embodiment. The server 1 includes, as functional blocks, a history reception unit 11, a data creation unit 12, an event history data holding unit 13, and a directed graph data holding unit 14.

The CPU 101 of the server 1 executes the directed graph data creation program held in the auxiliary storage device 104, thereby performing processing by the history reception unit 11 and the data creation unit 12. Note that the functional blocks may be implemented by a piece of hardware, such as an FPGA (Field-Programmable Gate Array).

The history reception unit 11 receives pieces of event history data which are sent from the mobile terminals 2 with predetermined frequency and stores the pieces of event history data in the event history data holding unit 13. The data creation unit 12 creates and updates a piece of directed graph data from pieces of event history data newly held in the event history data holding unit 13 and sends the updated piece of directed graph data to the mobile terminals 2, with predetermined frequency. The predetermined frequency, with which a piece of directed graph data is updated, is set as, for example, a frequency per day, a frequency per week, or a frequency per month. The history reception unit 11 is an example of a "reception unit" of a "server". The data creation unit 12 is an example of a "generation unit" and an example of a "sending unit".

The event history data holding unit 13 and the directed graph data holding unit 14 are each created in advance or dynamically created through execution of the directed graph data creation program in a storage region of the auxiliary storage device 104. The details of pieces of data to be held in the event history data holding unit 13 and the directed graph data holding unit 14 will be described later.

The mobile terminal 2 includes, as functional blocks, a sensing control unit 21, a history sending unit 22, a directed graph data holding unit 23, an event history data holding unit 24, an event occurrence ratio holding unit 25, sensing units 26A to 26F, place data holding units 27A to 27F corresponding to the respective sensing units 26A to 26F, a data reception unit 28, and a service execution unit 29. Hereinafter, the sensing units 26A to 26F and the place data holding units 27A to 27F will be referred to as the sensing units 26 and the place data holding units 27, respectively, when there is no need for distinction among the sensing units 26A to 26F and the place data holding units 27A to 27F.

The CPU 201 executes the sensing control program held in the storage unit 202, thereby executing processing by the sensing control unit 21, the history sending unit 22, and the data reception unit 28. Note that the functional blocks may be implemented by, for example, a piece of hardware, such as an FPGA.

The sensing control unit 21 controls the sensing units 26. More specifically, the sensing control unit 21 performs the processing below. The sensing control unit 21 stores events detected by the sensing units 26 in the event history data holding unit 24. The sensing control unit 21 also creates a directed graph with a latest event as an origin from pieces of information held in the directed graph data holding unit 23 and controls the sensing units 26 using the directed graph. The details of processing by the sensing control unit 21 will be described later. The sensing control unit 21 is an example of a "control unit".

The history sending unit 22 reads out pieces of event history data which are newly added to the event history data holding unit 24 during an interval for a predetermined frequency and sends the pieces of event history data to the server 1, with the predetermined frequency. The data reception unit 28 receives a piece of directed graph data sent from the server 1 with the predetermined frequency and stores the piece of directed graph data in the directed graph data holding unit 23. The predetermined frequency, with which a piece of event history data is sent to the server 1, is set as, for example, a frequency per day, a frequency per week, or a frequency per month.

Each sensing unit 26 corresponds to a sensor module and a program which controls the module. Turn-on or turn-off of the sensing unit 26 means, for example, one or both of activating or deactivating a program for a corresponding sensor module and powering on or off the corresponding sensor module. The place data holding unit 27 holds a piece of place information on a device that sends out a radio wave or a sound wave signal serving as an object to be detected by the corresponding sensing unit 26, or a marker. A more specific description will be given below.

The sensing unit 26A performs sensing through the Wi-Fi module with a predetermined frequency to detect a Wi-Fi radio wave. The scanning frequency is set, for example, on seconds or minute scale. The correspondence between the SSID of a Wi-Fi access point and a piece of place information on a range of detection for a radio signal including the SSID is held in the Wi-Fi place data holding unit 27A.

The sensing unit 26A acquires the SSID of a Wi-Fi access point included in a radio signal through sensing. The sensing unit 26A detects an enter event into a range of detection of the Wi-Fi access point, for example, when the sensing unit 26A detects a change in power strength of a radio signal from less than a predetermined threshold to equal to or greater than the predetermined threshold. The sensing unit 26A detects a stay event within the range of detection of the Wi-Fi access point, for example, when the radio signal power strength exceeds the predetermined threshold consecutively for a predetermined time period. The sensing unit 26A detects an exit event from the range of detection of the Wi-Fi access point, for example, when the sensing unit 26A detects a change in the detected radio signal power strength from equal to or greater than the predetermined threshold to less than the predetermined threshold.

A radio signal sent out from a Wi-Fi access point includes an SSID, and the sensing unit 26A acquires a piece of place information on the range of detection of the Wi-Fi access point using the SSID as a key from the Wi-Fi place data holding unit 27A.

The sensing unit 26B performs sensing through the Bluetooth® module with a predetermined frequency to detect a radio wave from a Bluetooth device. The correspondence between the ID of a Bluetooth device which sends out a radio wave and a piece of place information on a range of detection for a radio wave sent out by the Bluetooth device is held in the Bluetooth place data holding unit 27B. The scanning frequency is set, for example, on second or minute scale.

Event detection processing by the sensing unit 26B is performed for radio waves of frequencies defined in Bluetooth and a threshold value in the same manner as with the sensing unit 26A. The sensing unit 26B detects an enter event, a stay event, or an exit event for a predetermined place.

The sensing unit 26C senses a GPS signal through the GPS reception module to acquire a latitude and a longitude. A piece of map information including the correspondence between absolute coordinates of a latitude and a longitude and a place is held in the GPS place data holding unit 27C. The sensing unit 26C acquires absolute coordinates of a latitude and a longitude from a GPS satellite signal and acquires a place corresponding to the absolute coordinates acquired from the GPS place data holding unit 27C, with a predetermined frequency. The frequency of acquiring absolute coordinates is set, for example, on second or minute scale.

The sensing unit 26C ongoingly monitors an obtained latitude and a longitude, and detects an enter, stay, or exit event for a predetermined place from a transition of the latitude and longitude.

The sensing unit 26D performs sensing through the microphone with a predetermined frequency to detect, for example, a sound wave signal (ultrasound wave) of a predetermined frequency outside an audible range which is superimposed on a sound signal of music or the like. The sensing frequency is set, for example, on second or minute scale. The correspondence among a sound wave frequency outside the audible range, the ID of a device that sends out a sound wave signal of the frequency, and a piece of place information on a range of detection for a sound wave signal sent out by the device is held in the sound wave place data holding unit 27D. The sensing unit 26D uses the frequency of a detected sound wave signal as a key to acquire the ID of a device that sends out the sound wave signal and a piece of place information on a range of detection of the device from the sound wave place data holding unit 27D.

Event detection processing by the sensing unit 26D is performed for a sound wave signal of a predetermined frequency outside the audible range and a predetermined threshold for the power strength of the sound wave signal in the same manner as with the sensing unit 26A. The sensing unit 26D detects an enter, stay, or exit event for a predetermined place.

The sensing unit 26E performs sensing through the NFC module with a predetermined frequency to detect a radio wave. Note that the sensing unit 26E is assumed to be a module having an IC card and a control circuit in the first embodiment. For example, when the mobile terminal 2 is brought close to within a predetermined distance of an NFC reader or the like, the sensing unit 26E comes into conduction, detects an NFC radio wave, and detects the NFC reader. The sensing unit 26E communicates with the detected NFC reader and acquires the ID of the NFC reader. The NFC place data holding unit 27E holds, for example, the correspondence between the ID of an NFC device, such as an NFC reader, and a piece of place information on installation of the NFC device.

When the sensing unit 26E detects an NFC reader, the sensing unit 26E detects a touch event on the NFC reader. A touch event is, for example, an event which is classified as a stay event in an installation location of an NFC reader.

The sensing unit 26F detects an identification marker from an image picked up by a user through the camera. The correspondence between an identification marker and a piece of place information on installation of the identification marker is held in the identification marker place data holding unit 27F.

When the sensing unit 26F detects an identification marker from a picked-up image, the sensing unit 26F detects a stay event in an installation location of the identification marker. A piece of place information on installation of an identification marker is acquired from the identification marker place data holding unit 27F.

When each sensing unit 26 detects an event, the sensing unit 26 notifies the sensing control unit 21 of a piece of event data. The sensing control unit 21 is notified of, for example, an event, a time of occurrence of the event, the type of the sensing unit 26 that has detected the event, and a piece of place information on occurrence of the event as a piece of event data. A piece of place information to be held in the place data holding unit 27 may be, for example, a place-name or a coded ID. In the first embodiment, a piece of place information is an ID common in a system. A piece of event data is held as a piece of event history data in the event log data holding unit 24 by the sensing control unit 21. Each sensing unit 26 is an example of a "sensing unit".

The service execution unit 29 provides a service utilizing control of the sensing unit 26 by the sensing control unit 21. Examples of the service include a service which delivers a piece of shop information or a piece of selling space information corresponding to the current place of a user of the mobile terminal 2 in a shopping center and a service which assists the staff of a shopping center in work and the like in each area. The service execution unit 29 is, for example, a process to be performed when the CPU 201 executes a service provision program held in the auxiliary storage device 202C.

The directed graph data holding unit 23, the event history data holding unit 24, and the event occurrence ratio holding unit 25 are created statistically in advance or dynamically through execution of the sensing control program in a storage region of the auxiliary storage device 202C. The data structures of pieces of data to be held in the directed graph data holding unit 23 and the event history data holding unit 24 are the same as those, respectively, of pieces of data to be held in the directed graph data holding unit 14 and the event history data holding unit 13 of the server 1.

<Data>

Pieces of information to be handled in the sensing control system 100 are a piece of directed graph data, a piece of event history data, and an event occurrence ratio in the first embodiment. The pieces of data will be described below.

FIG. 6 is an example of a diagram illustrating the specification of a piece of event history data. The event history data holding unit 13 of the server 1 and the event history data holding unit 24 of the mobile terminal 2 each store a piece of event history data conformable to the specification illustrated in FIG. 6. Note that pieces of event history data for all mobile terminals 2 in the sensing control system 100 are held in the event history data holding unit 13 of the server 1 while pieces of event history data for the mobile terminal 2 itself are held in the event history data holding unit 24 of the mobile terminal 2.

A piece of event history data includes a time of occurrence of an event, a sensing unit as a detector, a place ID, and an event type. These pieces of data are all pieces of data created by the sensing units 26.

Note that the specification of a piece of event history data illustrated in FIG. 6 is merely illustrative and that omission, replacement, and addition of a piece of information to be included in a piece of event history data may be appropriately performed. For example, each mobile terminal 2 may send a piece of event history data with the ID of the mobile terminal 2 itself included therein at the time of sending of the piece of event history data to the server 1, and a piece of event history data of the server 1 may include the ID of the mobile terminal 2 as a creator of the piece of event history data.

FIG. 7 is an example of a diagram illustrating data included in a directed graph data holding unit. The directed graph data holding unit 14 of the server 1 and the directed graph data holding unit 23 of the mobile terminal 2 hold the same data. A node table, a first arc table, and a second arc table are held in the directed graph data holding units 14 and 23.

The node table is a table which defines all nodes of a directed graph used in the sensing control system 100. In the first embodiment, an event is identified by a place of occurrence, the type of a sensing unit as a detector, and an event type. Thus, a node is identified by a place of occurrence and the type of a sensing unit as a detector. The node table includes a node ID, a place ID, the type of a sensing unit, an event type, and the number of logs generated. The number of logs generated is the number of occurrences of an event corresponding to a node in question.

The first arc table is a table which defines all arcs of the directed graph used in the sensing control system 100. An arc is identified by a transition source node and a transition destination node. In the first arc table, an arc ID, a transition source node ID (Node ID (From) in FIG. 7), a transition destination node ID (Node ID (To) in FIG. 7), a node-to-node length (an elapsed time period), and the number of logs generated are associated with each other. As a node-to-node length to be held in the first arc table, a smallest value among histories is held. The number of logs generated is the number of occurrences of an event transition corresponding to an arc.

The second arc table is a table which holds a distribution of length of each arc defined in the first arc table. The number of occurrences for each of groups, having respective ranges of a predetermined length of time, is held for each arc in the second arc table. In the example illustrated in FIG. 7, arc lengths are divided into groups having respective ranges of 5 minutes. The directed graph data holding unit 23 is an example of a "storage unit". A piece of information to be held in the directed graph data holding unit 23 is an example of a "piece of event transition information".

FIG. 8 is an event occurrence ratio table to be held in the event occurrence ratio holding unit 25 of each mobile terminal 2. The event occurrence ratio table is a table which holds an event occurrence ratio for each of the types of the sensing units 26 in the mobile terminal 2. The event occurrence ratio table holds the type of the sensing unit 26 of the mobile terminal 2, an event occurrence ratio, and the number of logs generated. The number of logs generated is the number of event occurrences detected by each sensing unit 26 in the mobile terminal 2. The event occurrence ratio holding unit 25 is an example of a "second storage unit". An event occurrence ratio is an example of an "event detection ratio".

<Flow of Process>
(Creation of Piece of Directed Graph Data)

Figure 9:
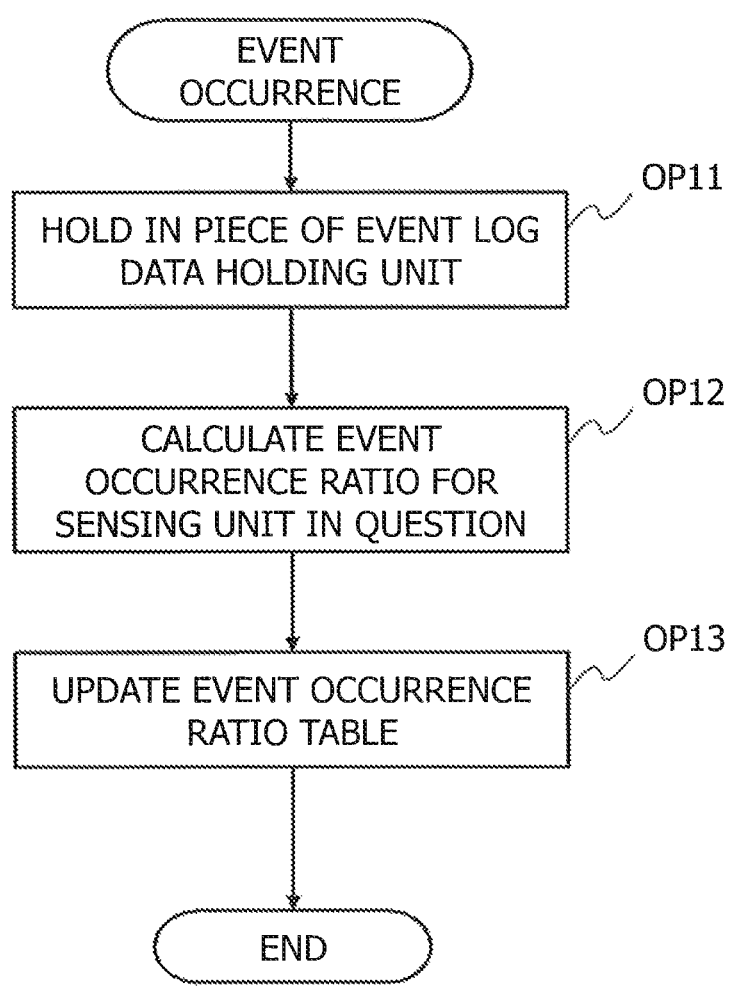
FIG. 9 is an example of a flowchart of a data update process by the mobile terminal upon occurrence of an event.

FIG. 9 is an example of a flowchart of a data update process upon occurrence of an event in the mobile terminal 2. The flowchart illustrated in FIG. 9 is started when the mobile terminal 2 detects event occurrence.

In OP11, the sensing control unit 21 holds a piece of event data, of which the sensing control unit 21 is notified by the sensing unit 26, in the event history data holding unit 24. The process then advances to OP12.

In OP12, the sensing control unit 21 calculates an event occurrence ratio for the sensing unit 26 for an event which has occurred. An event occurrence ratio is obtained as the proportion of the number of logs generated for the sensing unit 26 in question to the total number of events which have occurred in the mobile terminal 2. More specifically, the sensing control unit 21 reads out the number of logs generated for each sensing unit 26 in the event occurrence ratio table and calculates the event occurrence ratio by dividing a value obtained by adding 1 to the number of logs generated for the sensing unit 26 for the event that has occurred by a value obtained by adding 1 to the total sum of the numbers of logs generated for all the sensing units 26. The process then advances to OP13.

In OP13, the sensing control unit 21 updates the event occurrence ratio table. More specifically, the sensing control unit 21 increments the number of logs generated for the sensing unit 26 in question in the event occurrence ratio table and updates an event occurrence ratio with a value calculated in OP12. After that, the process illustrated in FIG. 9 ends.

The mobile terminal 2 sends a piece of event history data newly held during an interval for a predetermined frequency to the server 1 with the predetermined frequency (OP1 in FIG. 3). The server 1 then generates and updates a piece of directed graph data from pieces of event history data sent from the mobile terminals 2, with a predetermined frequency (OP2 in FIG. 3).

Figure 10A:
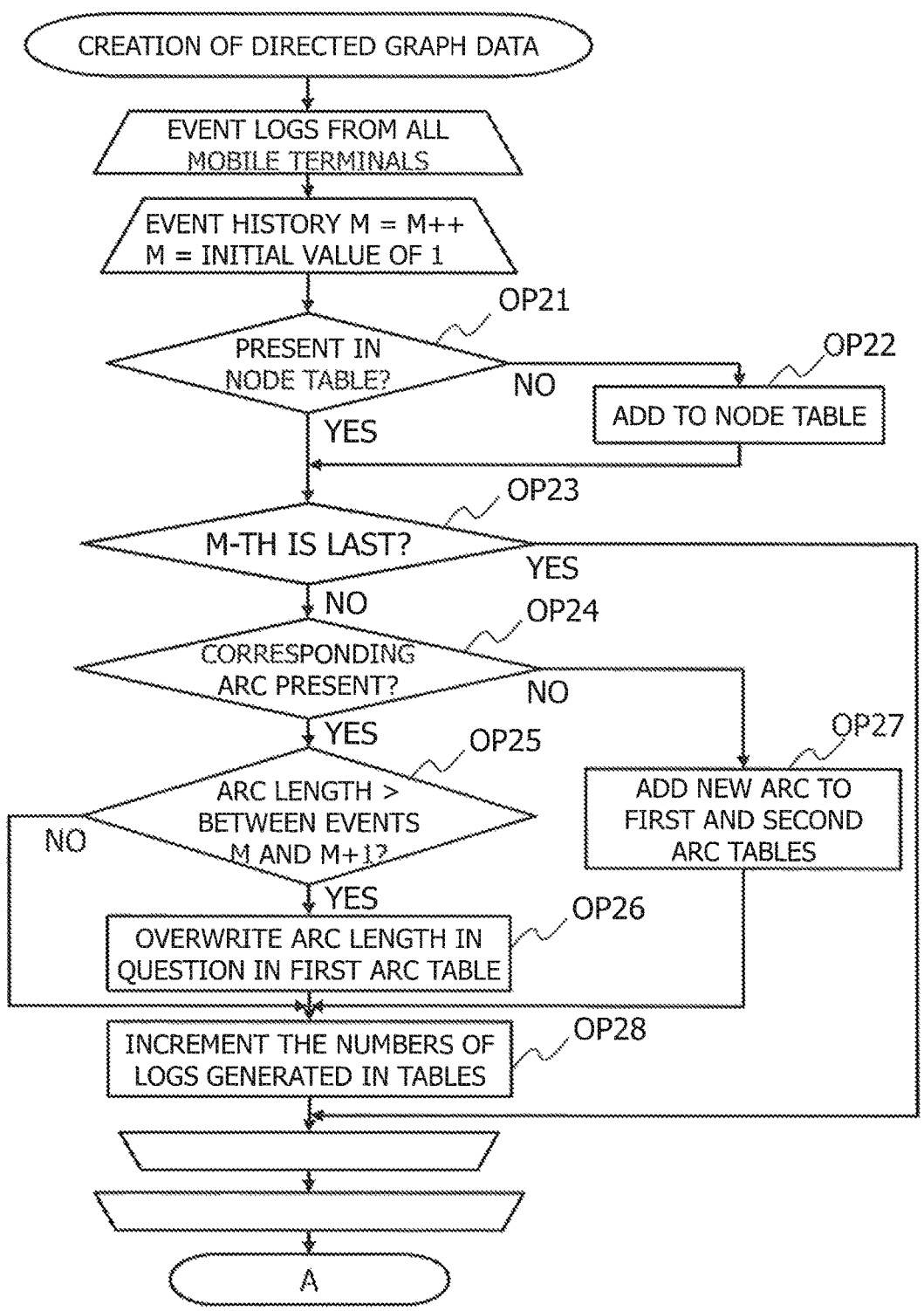
FIG. 10A is an example of a flowchart of a directed graph data creation process by the server.
Figure 10B:
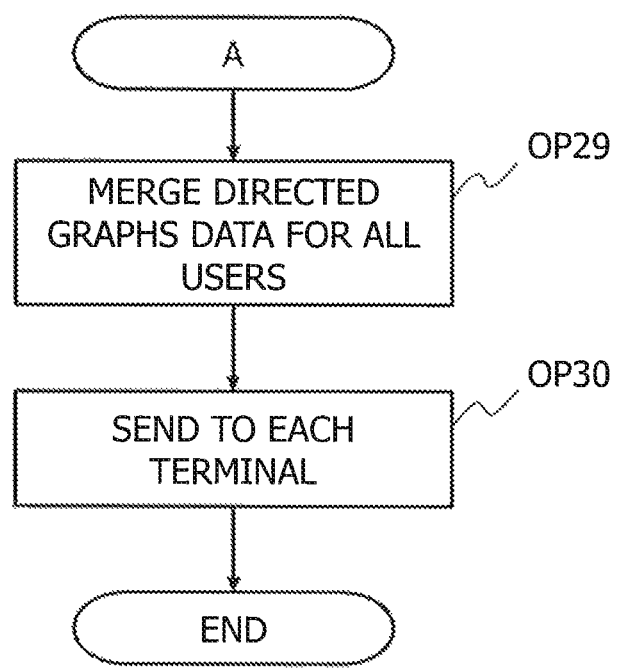
FIG. 10B is an example of the flowchart of the directed graph data creation process by the server.

FIGS. 10A and 10B are an example of a flowchart of a directed graph data creation process by the server 1. The flowchart illustrated in FIGS. 10A and 10B is started, for example, with a predetermined frequency. The predetermined frequency is set, for example, minute, hour, day, or month scale by the administrator of the sensing control system 100.

Processes in OP21 to OP28 are executed times, the number of which corresponds to the total number of new pieces of event history data received from each mobile terminal 2. A variable M is a pointer which points to a processing object among new pieces of event history data received from one mobile terminal 2 and has an initial value of 1. The variable M of 1 indicates that the processing object is one with an oldest time of event occurrence among the new pieces of event history data received from the mobile terminal 2. Hereinafter, a piece of event history data as the processing object will be simply referred to as an M-th event.

In OP21, the data creation unit 12 determines whether a node corresponding to the M-th event is registered in the node table. If there is a node corresponding to the M-th event in the node table (OP21:YES), the process advances to OP23. If there is no node corresponding to the M-th event in the node table (OP21:NO), the process advances to OP22.

In OP22, the data creation unit 12 assigns an ID to the M-th event and adds the M-th event to the node table. The process then advances to OP23.

In OP23, it is determined whether the M-th event is a last piece of event history data received from the mobile terminal 2 in question. If the M-th event is the last piece of event history data received from the mobile terminal 2 in question (OP23:YES), the data creation unit 12 shifts to processing of pieces of event history data from the next mobile terminal 2. Or if processing is over for pieces of event history data from all the mobile terminals 2, the process advances to OP29.

If the M-th event is not the last piece of event history data received from the mobile terminal 2 in question (OP23:NO), the process advances to OP24.

In OP24, the data creation unit 12 determines whether there is an arc corresponding to a transition from the M-th event to a (M+1)-th event in the first arc table. If there is an arc corresponding to a transition from the M-th event to the (M+1)-th event in the first arc table (OP24:YES), the process advances to OP25. If there is no arc corresponding to a transition from the M-th event to the (M+1)-th event in the first arc table (OP24:NO), the process advances to OP27, and the data creation unit 12 adds a new arc to the first and second arc tables. The process then advances to OP28.

In OP25, the data creation unit 12 compares a time interval between the M-th event and the (M+1)-th event with a length (of time) of the corresponding arc in the first arc table. If the time interval between the M-th event and the (M+1)-th event is shorter than the length (of time) of the corresponding arc in the first arc table (OP25:YES), the process advances to OP26. In OP26, the data creation unit 12 overwrites the length (of time) of the corresponding arc in the first table with the time interval between the M-th event and the (M+1)-th event. With this overwriting, a length in the first arc table is updated to be a minimum value. The process then advances to OP28.

If the time interval between the M-th event and the (M+1)-th event is equal to or greater than the length (of time) of the corresponding arc in the first arc table (OP25:NO), the process advances to OP28 without updating of the length (of time) of the corresponding arc in the first arc table.

In OP28, the data creation unit 12 increments the number of logs generated corresponding to the M-th event and the numbers of logs generated corresponding to the arc corresponding to a transition from the M-th event to the (M+1)-th event in the node table, the first arc table, and the second arc table.

After that, the variable M is incremented, and the processes in OP21 to OP28 are repeatedly executed. When the processes in OP21 to OP28 are over for all pieces of event history data from all the mobile terminals 2, the process advances to OP29.

In OP29, the data creation unit 12 merges pieces of directed graph data processed in OP21 to OP28 for all the mobile terminals 2. In OP30, the data creation unit 12 sends a resultant piece of directed graph data to each mobile terminal 2. After that, the process illustrated in FIGS. 10A and 10B ends.

When each mobile terminal 2 receives the piece of directed graph data from the server 1, the mobile terminal 2 updates a piece of directed graph data held in the directed graph data holding unit 23 with the received piece of directed graph data.

(Sensing Control Process in Event-Undetected State)

In the first embodiment, a node as a latest event is used as an origin of a directed graph. However, in a state where no event is detected, such as upon activation of the mobile terminal 2 or upon reactivation of the sensing control program, a node as an origin is not determined, and creation of a directed graph is impossible. Thus, sensing control is infeasible until an event is detected for a first time.

For this reason, if the mobile terminal 2 is provided with the sensing unit 26 capable of acquiring absolute coordinates in the first embodiment, the mobile terminal 2 provisionally sets a node as an origin of a directed graph utilizing absolute coordinates, creates the directed graph, and performs sensing control, in an event-undetected state. A node which is provisionally set as an origin of a directed graph will be referred to as a provisional node hereinafter. Examples of the sensing unit 26 capable of acquiring absolute coordinates include the sensing unit 26C that acquires absolute coordinates through the GPS reception module.

Figure 11A:
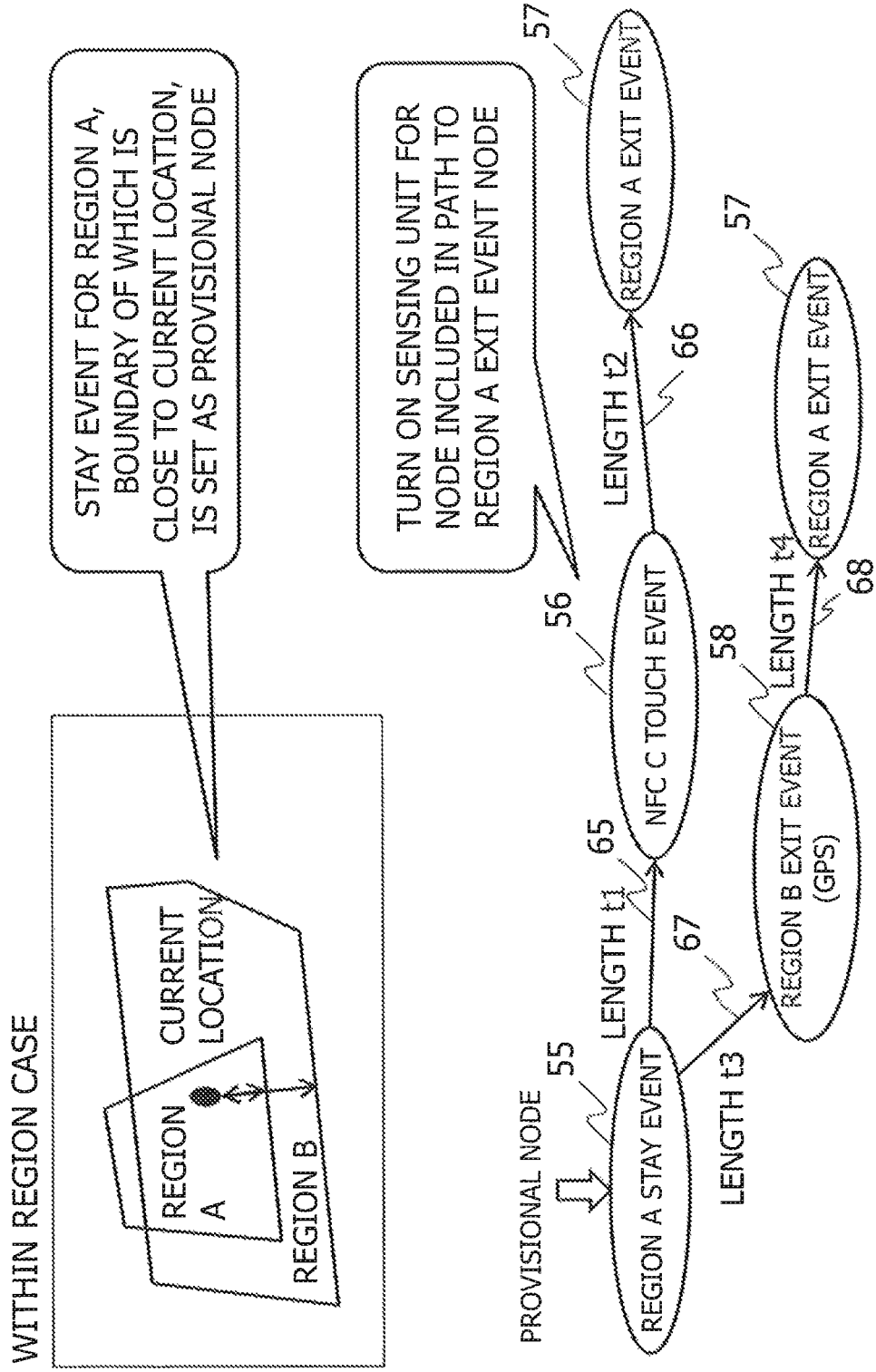
FIG. 11A is an example of a diagram illustrating a provisional node determination process utilizing absolute coordinates.

FIGS. 11A and 11B are each an example of a diagram illustrating a provisional node determination process utilizing absolute coordinates. An example of the provisional node determination process when it is determined based on absolute coordinates that the mobile terminal 2 is present within a region A and a region B is illustrated in FIG. 11A.

If the mobile terminal 2 is present within a plurality of regions, the sensing control unit 21 of the mobile terminal 2 determines, as a provisional node, a stay event within one of the regions, a boundary of which is closer to the mobile terminal 2. A piece of information on a boundary of each region can be acquired from, for example, the GPS place data holding unit 27C.

For example, in the example illustrated in FIG. 11A, a boundary of the region A is closer to the current location of the mobile terminal 2 acquired as absolute coordinates. The sensing control unit 21 determines, as a provisional node, a node corresponding to a stay event for the region A.

After the provisional node determination, the sensing control unit 21 creates a directed graph with the provisional node as an origin. Generally, after a stay event within a region, an exit event from the region occurs. For this reason, an event as a node included in a transition process from the node as the stay event within the region that is the provisional node to a node as an exit event from the region has a high probability of occurring. Thus, the sensing control unit 21 turns on the sensing unit 26 corresponding to a node included in a transition process from a provisional node to a node corresponding to an exit event from a region associated with the provisional node.

In the example illustrated in FIG. 11A, a provisional node 55 is a stay event within the region A. A node 56 is connected to the provisional node 55 by an arc 65, and a node 57 is connected to the node 56 by an arc 66. A node 58 is also connected to the provisional node 55 by an arc 67, and the node 57 is connected to the node 58 by an arc 68.

The node 57 is an exit event for the region A. Thus, in the example illustrated in FIG. 11A, the sensing units 26 corresponding to the node 56, the node 58, and the node 57 included in a transition process from the provisional node 55 to the node 57 are turned on.

An example of the provisional node determination process when it is determination based on absolute coordinates that the mobile terminal 2 is present within no region is illustrated in FIG. 11B. In this case, the sensing control unit 21 of the mobile terminal 2 determines, as a provisional node, a node corresponding to an exit event from a region, a boundary of which is closest to a current location. In the example illustrated in FIG. 11B, a boundary of a region B is closest to the current location. The sensing control unit 21 determines an exit event from the region B as the provisional node.

After the provisional node determination, the sensing control unit 21 creates a directed graph with the provisional node as an origin. Thereafter, until an event is detected, the sensing control unit 21 turns on the sensing unit 26 for a node, the sum of arc lengths from the provisional node of which is equal to or less than an elapsed time period $T+\alpha$, as time passes. Reference character T denotes an elapsed time period since the provisional node determination, and reference character $\alpha$ denotes an offset time period.

In the example illustrated in FIG. 11B, a provisional node 58A is an exit event from the region B. A node 58B is connected to the provisional node 58A by an arc 69A, and a node 58C is connected to the node 58B by an arc 69B. A node 58D is also connected to the provisional node 58A by an arc 69C.

Assume in FIG. 11B that $t3<t1$. If the elapsed time period $T+\alpha<t3$, every sensing unit 26 is off. If $t3 \leq$ the elapsed time period $T+\alpha<t1$, the sensing unit 26 corresponding to the node 58D is turned on. If $t1 \leq$ the elapsed time period $T+\alpha<t1+t2$, the sensing units 26 corresponding to the node 58B and the node 58D are turned on. If $t1+t2 \leq$ the elapsed time period $T+\alpha$, the sensing units 26 corresponding to the node 58B, the node 58C, and the node 58D are turned on.

If the mobile terminal 2 is not provided with the sensing unit 26 capable of acquiring absolute coordinates, the sensing control unit 21 performs sensing control without determining a provisional node and generating a directed graph, in the event-undetected state. The sensing control unit 21 sets an operation interval of each sensing unit 26 according to the event occurrence ratio of the sensing unit 26 held in the event occurrence ratio holding unit 25 in the event-undetected state, if the mobile terminal 2 is not provided with the sensing unit 26 capable of acquiring absolute coordinates.

Figure 12A:
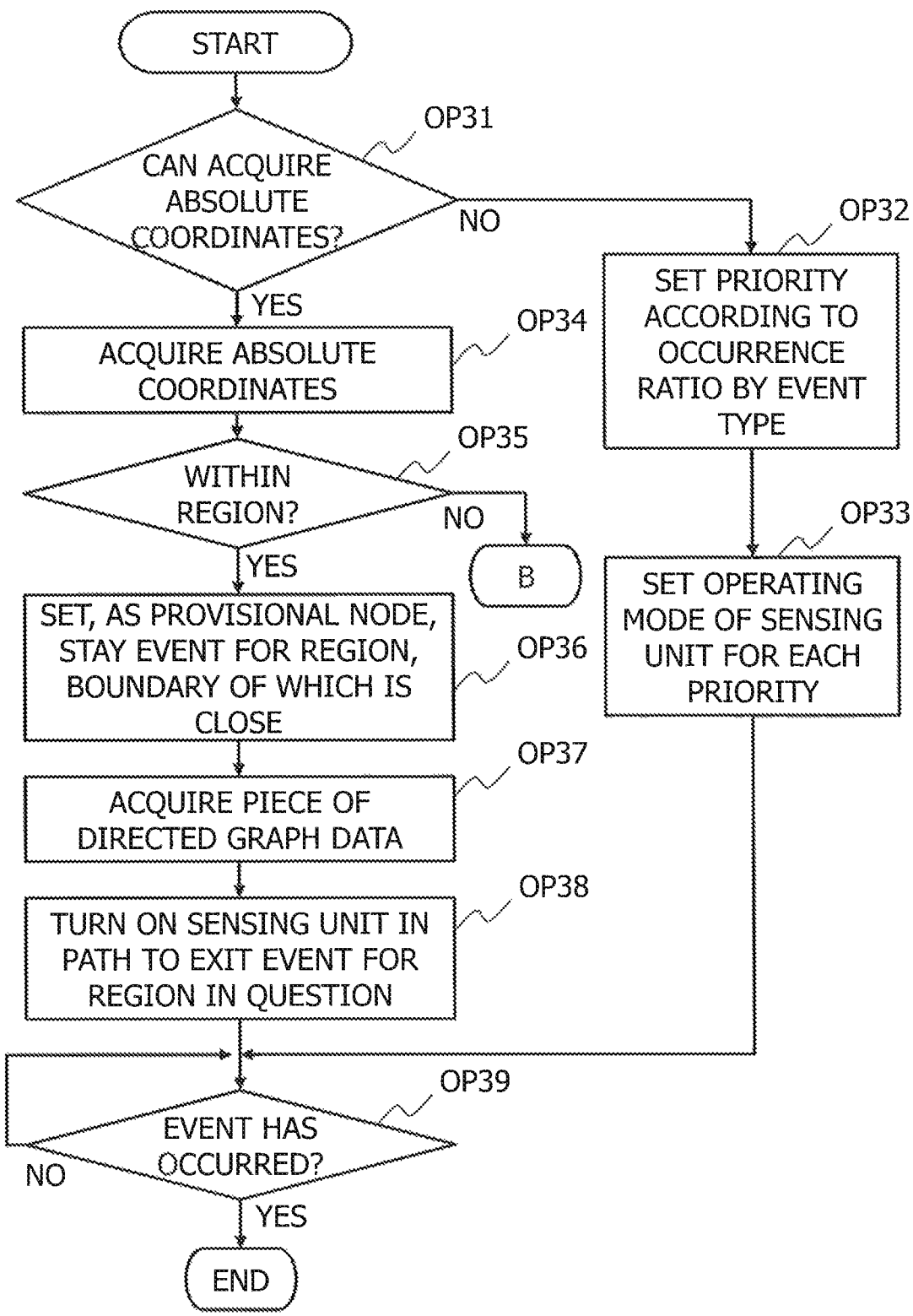
FIG. 12A is an example of a flowchart of a sensing control process in an event-undetected state in the mobile terminal.
Figure 12B:
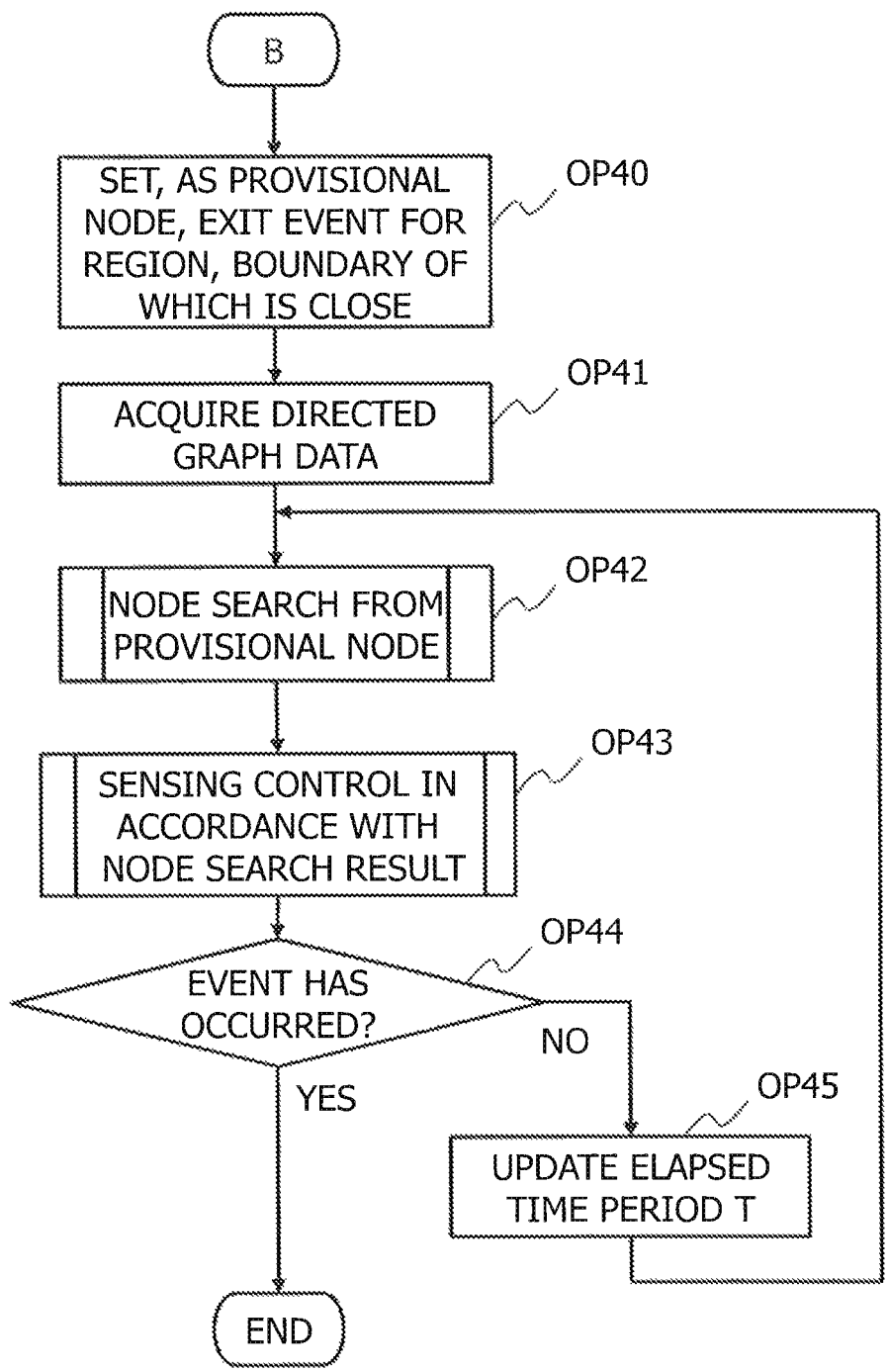
FIG. 12B is an example of a flowchart of the sensing control process in the event-undetected state in the mobile terminal.

FIGS. 12A and 12B are an example of a flowchart of a sensing control process in the event-undetected state by the mobile terminal 2. The flowchart illustrated in FIGS. 12A and 12B is started upon, for example, activation of the sensing control program accompanying activation of the mobile terminal 2, reactivation of the sensing control program, or the like.

In OP31, the sensing control unit 21 determines whether the mobile terminal 2 is provided with the sensing unit 26 capable of acquiring absolute coordinates. If the mobile terminal 2 is provided with the sensing unit 26 capable of acquiring absolute coordinates (OP31:YES), the process advances to OP34. If the mobile terminal 2 is not provided with the sensing unit 26 capable of acquiring absolute coordinates (OP31:NO), the process advances to OP32.

OP32 and OP33 are sensing control processing in the event-undetected state when the mobile terminal 2 is not provided with the sensing unit 26 capable of acquiring absolute coordinates. In OP32, the sensing control unit 21 reads out the event occurrence ratio for each sensing unit 26 from the event occurrence ratio holding unit 25 and sets priorities such that the sensing unit 26 with a higher event occurrence ratio has a higher priority.

In OP33, the sensing control unit 21 sets the operating mode of the sensing unit 26 for each priority. The operation interval of the sensing unit 26 is set depending on the operating mode. Examples of an operation mode include priority mode, normal mode, and standby mode. The operation intervals for the modes are 30 seconds, 1 minute, and 5 minutes, respectively. Note that an operating mode is not limited to these. Values of the interval for each operating mode differ according to the type of the sensing unit 26.

For example, the sensing control unit 21 sets the operating mode of the sensing unit 26 that ranks first in priority to priority mode. For example, the sensing control unit 21 sets the operating mode of the sensing unit 26 that ranks second in priority to normal mode. For example, the sensing control unit 21 sets the operating mode of the sensing unit 26 that ranks third or lower in priority to standby mode.

Note that although a priority is assigned to each sensing unit 26 according to event occurrence ratio, and the operating mode is determined according to priority, in OP32 and OP33, the present invention is not limited to this. For example, a threshold for an event occurrence ratio may be set, and the operating mode of each sensing unit 26 may be determined according to the relation between the threshold and the event occurrence ratio.

In OP34, the sensing control unit 21 instructs the sensing unit 26 capable of acquiring absolute coordinates to acquire absolute coordinates and acquires absolute coordinates. The process then advances to OP35.

In OP35, the sensing control unit 21 determines from the absolute coordinates whether the mobile terminal 2 is present within any region. If the mobile terminal 2 is present within any region (OP35:YES), the process advances to OP36. If the mobile terminal 2 is present within no region (OP35:NO), the process advances to OP40.

Processes in OP36 to OP38 are sensing control processing in the event-undetected state when the mobile terminal 2 is present within any region. In OP36, the sensing control unit 21 sets, as a provisional node, a stay event within a region, a boundary of which is closest to a current location. The process then advances to OP37.

In OP37, the sensing control unit 21 acquires pieces of data to be used in a directed graph with the provisional node as an origin from the directed graph data holding unit 23 and creates the directed graph. The created directed graph is held in, for example, a temporary storage region of the RAM 202B and, when the process in FIGS. 12A and 12B ends, is deleted. The process then advances to OP38.

In OP38, the sensing control unit 21 turns on the sensing unit 26 corresponding to a node included in a transition process from the provisional node to a node as an exit event from the region associated with the provisional node in the directed graph. The process then advances to OP39.

In OP39, the sensing control unit 21 stands by for detection of event occurrence by the sensing units 26. If occurrence of an event is detected by any sensing unit 26 (OP39:YES), the process illustrated in FIGS. 12A and 12B ends, and a sensing control process (in FIG. 13 to be described later) in an event-detected state is then started.

Processes in OP40 to OP45 are sensing control processing in the event-undetected state when the mobile terminal 2 is present within no region. In OP40, the sensing control unit 21 sets, as a provisional node, an exit event from a region, a boundary of which is closest to the current location. The process then advances to OP41.

In OP41, the sensing control unit 21 acquires pieces of data to be used in a directed graph with the provisional node as an origin from the directed graph data holding unit 23 and creates the directed graph. The created directed graph is held in, for example, the temporary storage region of the RAM 202B and, when the process in FIGS. 12A and 12B ends, is deleted. The process then advances to OP42.

In OP42, the sensing control unit 21 performs a node search from the provisional node. The node search is a process of determining whether each node satisfies predetermined conditions. The predetermined conditions are, for example, that the sum of arcs from the provisional node (origin node) is larger than an elapsed time period T+α and that the node has already undergone a node search. If the predetermined conditions are satisfied, a node search ends for a branch in question. The details of the node search process will be described later with reference to FIG. 14.

In OP43, the sensing control unit 21 performs sensing control in accordance with a result of the node search. The details of the sensing control in accordance with the result of the node search will be described later. For example, by the node search process in OP42, the sensing control unit 21 determines the sensing unit 26 for a node, the sum of arcs of which is equal to or less than the elapsed time period T+α, to be targeted for turn-on. In OP43, the sensing control unit 21 turns on the sensing unit 26, corresponding to a node equal to or greater than the elapsed time period T+α, which is determined to be targeted for turn-on as the result of the node search. The process then advances to OP44.

In OP44, the sensing control unit 21 stands by for detection of event occurrence by the sensing unit 26. If occurrence of an event is detected by any sensing unit 26 (OP44:YES), the process illustrated in FIGS. 12A and 12B ends, and the sensing control process (in FIG. 13 to be described later) in the event-detected state is then started.

If occurrence of an event is not detected for a predetermined time period (OP44:NO), the process advances to OP45. In OP45, the sensing control unit 21 updates the elapsed time period T. After that, the process returns to OP42 to make a node search using the updated elapsed time period T.

Note that, in the above-described sensing control process in the event-undetected state when the mobile terminal 2 is present within any region, a process is performed of turning on the sensing units 26 for all nodes included in a transition process from a provisional node (origin node) to a node as an exit event from a region associated with the provisional node. With this process, a load on the node search process can be reduced. Note that the present invention is not limited to this and that the node search process may also be performed when the mobile terminal 2 is present within any region, in the same manner as when the mobile terminal 2 is present within no region.

(Sensing Control Process in Event-Detected State)

Figure 13:
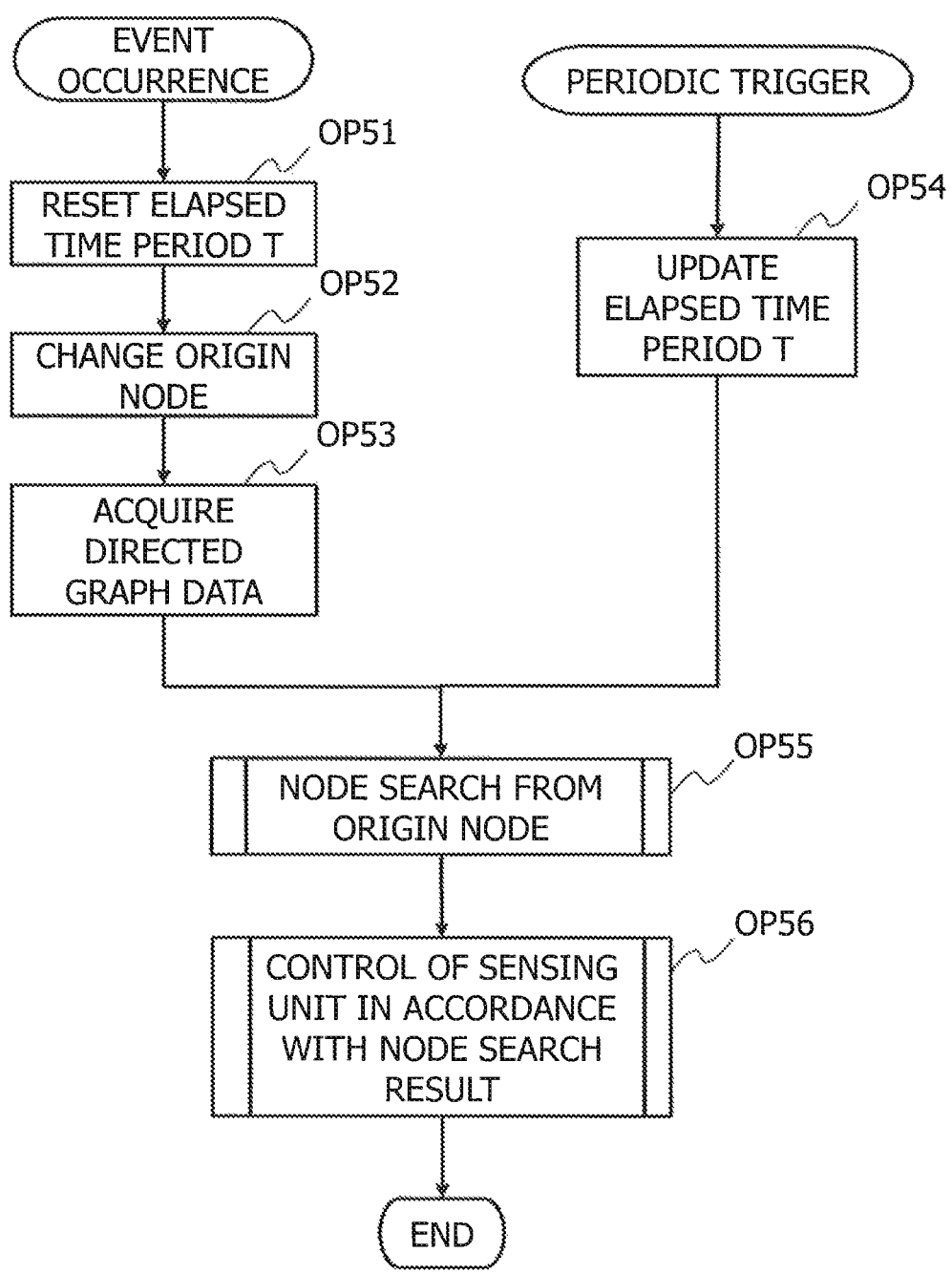
FIG. 13 is an example of a flowchart of a sensing control process in an event-detected state in the mobile terminal.

FIG. 13 is an example of a flowchart of the sensing control process in the event-detected state in the mobile terminal 2. The event-detected state is a state where occurrence of at least one event has been detected. The flowchart illustrated in FIG. 13 is started upon detection of event occurrence or with predetermined frequency. The predetermined frequency is set, for example, on second or minute scale.

Processes in OP51 to OP53 are processing when event occurrence is detected. Detection of event occurrence is performed by the sensing units 26.

In OP51, the sensing control unit 21 resets an elapsed time period T. The elapsed time period T here indicates an elapsed time period since occurrence of an event as an origin node. In OP52, the sensing control unit 21 changes an origin node for a directed graph to a node as a latest event. In OP53, the sensing control unit 21 acquires pieces of data to be used in a directed graph from the directed graph data holding unit 23 and creates the directed graph. The created directed graph is held in, for example, the temporary storage region of the RAM 202B and, when the process in FIG. 13 ends, is deleted. The process then advances to OP55.

OP54 is processing to be performed with the predetermined frequency until an event is detected next after the detection of the latest event. In OP54, the sensing control unit 21 updates the elapsed time period T. The process then advances to OP55.

In OP55, the sensing control unit 21 performs a node search through the created directed graph from the origin node. With the node search, a node, the sum of arcs from the origin node of which is not more than the elapsed time period, is extracted. The details of the node search will be described later.

In OP56, the sensing control unit 21 performs sensing control in accordance with a result of the node search. The details of the sensing control processing will be described later. When the process in OP56 ends, the process illustrated in FIG. 13 ends.

(Node Search Process)

Figure 14:
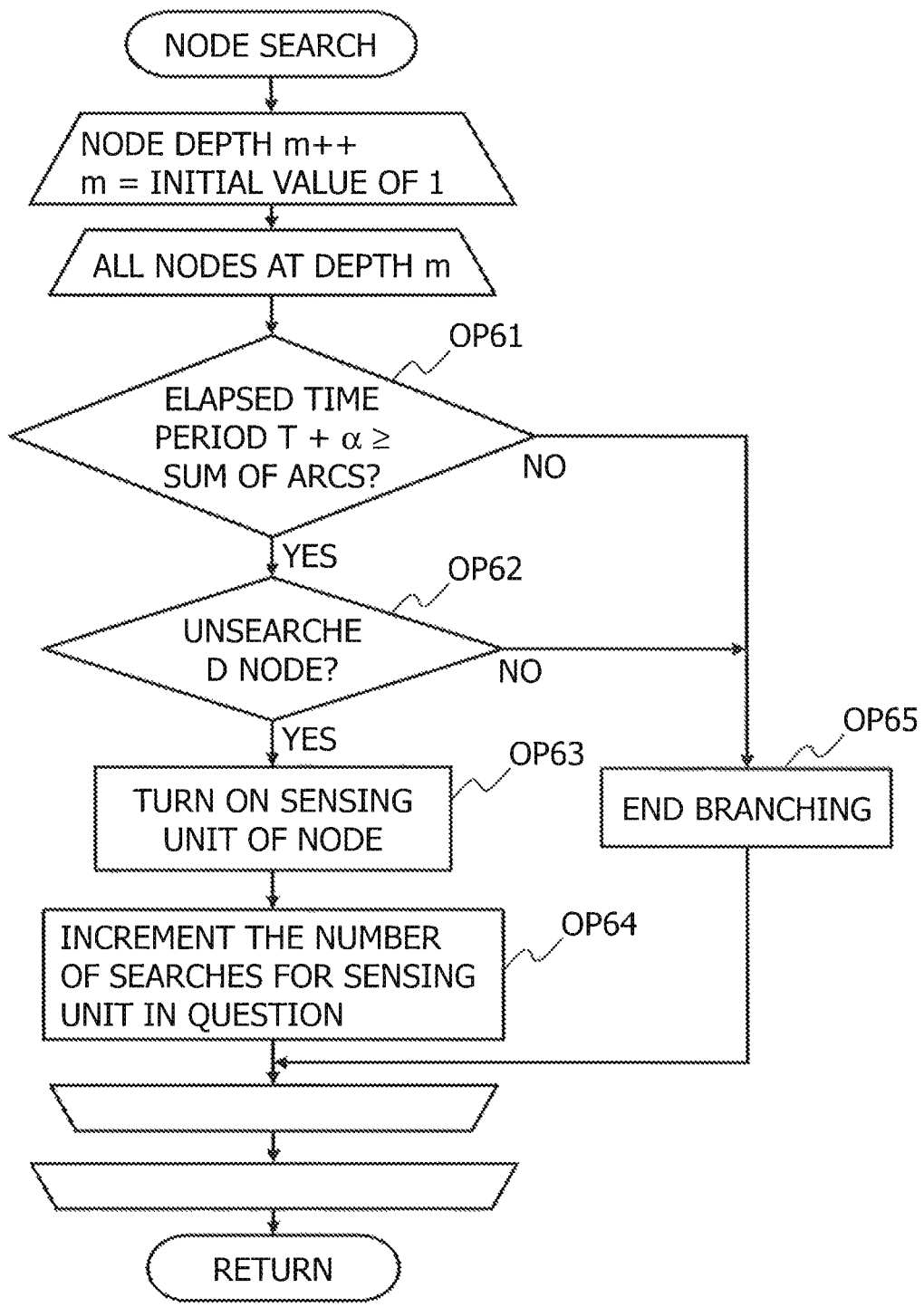
FIG. 14 is an example of a flowchart of a node search process.

FIG. 14 is an example of a flowchart of the node search process. When an origin node is determined, an arc with the origin node as a starting point is extracted from the first arc table, a node located at an ending point of the extracted arc is determined, and an arc with the determined node as a start point is extracted from the first arc table. With repetition of this, a directed graph is created.

In the example illustrated in FIG. 14, a node connected to an origin node via one arc is assumed to be a node at depth 1. A node connected to the origin node via m arcs and (m−1) nodes is assumed to be a node at depth m. In FIG. 14, m is a variable indicating the depth of a node and is a positive integer. The initial value of the variable m is 1.

Processes in OP61 to OP65 are executed for all nodes at depth m in a directed graph created in OP41 of FIG. 12B or OP53 of FIG. 13. A node as a processing object will be referred to as an object node hereinafter.

In OP61, the sensing control unit 21 determines whether an elapsed time period T+α is equal to or greater than the sum of lengths of arcs included in a transition process from the origin node to an object node. If the elapsed time period T+α is equal to or greater than the sum of lengths of arcs included in the path from the origin node to the object node (OP61:YES), the process advances to OP62. If the elapsed time period T+α is less than the sum of lengths of arcs included in the path from the origin node to the object node (OP61:NO), the process advances to OP65.

In OP62, the sensing control unit 21 determines whether the object node is an unsearched node. If the object node is an unsearched node (OP62:YES), the sensing control unit 21 records the object node as already-searched in the temporary storage region of the RAM 202B. The record indicating the node is already-searched is deleted at the end of the node search process. After that, the process advances to OP63. If the object node is an already-searched node (OP62:NO), the process advances to OP65. Whether the object node is already-searched is determined by referring to a record on an already-searched node in the temporary storage region of the RAM 202B.

In OP63, the sensing control unit 21 determines to make the sensing unit 26 of the object node to be turn-on. The process then advances to OP64.

In OP64, the sensing control unit 21 increments the number of searches for the sensing unit 26 determined to be turn-on in OP63. The number of searches for each sensing unit 26 is, for example, recorded in the temporary storage region of the RAM 202B, has an initial value of 0, and is reset at the start of the node search process.

In OP65, since the sum of lengths of arcs included in a transition process from the origin node to the object node is larger than the elapsed time period T+α or the object node is an already-searched node, the sensing control unit 21 does not perform a node search for a branch beyond the object node and ends branching. Ending branching in a case where an object node is already-searched allows a reduction in the number of repetitions of a loop in the search process.

When the process in OP64 or OP65 ends, processing is performed for a next node at depth m from OP61. If the object node is a last node at depth m, the variable m is incremented, and processing is performed for a first node at a next depth from OP61. When the processes in OP61 to OP65 are over for every node that can be an object node in the directed graph, the node search process illustrated in FIG. 14 ends. A sensing control process is then executed on the basis of a result of the node search process. Note that the flowchart illustrated in FIG. 14 is merely illustrative and that the present invention is not limited to this.

(Sensing Control Process)

In the first embodiment, there are available the four methods below for the sensing control process to be performed in accordance with a result of the node search process. Any method may be adopted.

A first method (method 1) is a method that turns on the sensing unit 26 determined to be turn-on by the node search process and turns off the other sensing units 26.

A second method (method 2) is a method that sets the operating mode of the sensing unit 26 determined to be turn-on by the node search process to normal mode and sets the operating modes of the other sensing units 26 to standby mode.

A third method (method 3) is a method that sets the operating mode of the sensing unit 26 determined to be turn-on by the node search process to priority mode or normal mode according to the proportion of the number of times a node is searched and sets the operating modes of the other sensing units 26 to standby mode.

A fourth method (method 4) is a method that sets the operating mode of the sensing unit 26 determined to be turn-on by the node search process to priority mode or normal mode according to a distribution of event (node) occurrence interval and sets the operating modes of the other sensing units 26 to standby mode.

Figure 15:
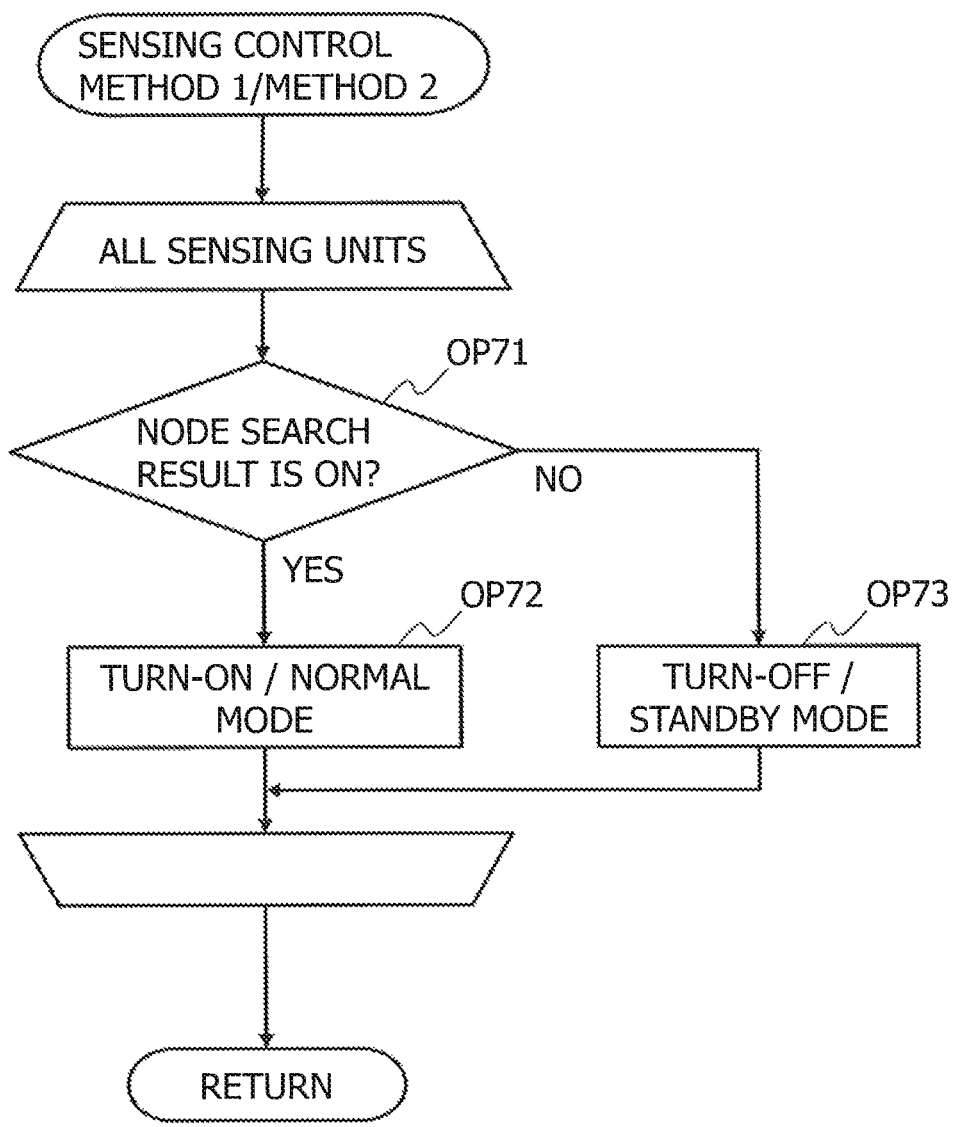
FIG. 15 is an example of a flowchart of method 1 and method 2 for a sensing control process to be performed according to a result of the node search process.

FIG. 15 is an example of a flowchart of method 1 and method 2 for the sensing control process to be performed according to a result of the node search process. A flowchart for method 1 will be described first.

Processes in OP71 to OP73 are executed for all sensing units 26 of the mobile terminal 2. In OP71, the sensing control unit 21 determines whether the sensing unit 26 as a processing object is determined to be turn-on as a result of the node search process.

If the sensing unit 26 as the processing object is determined to be turn-on by the node search process (OP71:YES), the process advances to OP72. In OP72, the sensing control unit 21 turns on the sensing unit 26 as the processing object.

If the sensing unit 26 as the processing object is not determined to be turn-on by the node search process (OP71:NO), the process advances to OP73. In OP73, the sensing control unit 21 turns off the sensing unit 26 as the processing object.

When the process in OP72 or OP73 ends, processing is repeated for the next sensing unit 26 from OP71. If the sensing unit 26 as the processing object is a last sensing unit, the process illustrated in FIG. 15 ends.

In the case of method 2, if the sensing unit 26 as the processing object is determined to be turn-on by the node search process (OP71:YES), the sensing control unit 21 sets the operating mode of the sensing unit 26 as the processing object to normal mode in OP72. On the other hand, if the sensing unit 26 as the processing object is not determined to be turn-on by the node search process (OP71:NO), the sensing control unit 21 sets the operating mode of the sensing unit 26 as the processing object to standby mode in OP73.

In the case of method 1, the sensing unit 26 determined to be turn-on as a result of the node search process is turned on, and the other sensing units 26 are turned off. This allows a reduction in the number of sensing units 26 to be turned on and a reduction in power consumed by the sensing units 26.

In the case of method 2, the operating mode of the sensing unit 26 determined to be turn-on as a result of the node search process is set to normal mode, and the operating modes of the other sensing units 26 are set to standby mode. The operation interval of the sensing unit 26 is longer in standby mode than in normal mode. Since method 2 allows a reduction in the number of operations of the sensing unit 26 in standby mode, power consumed by the sensing units 26 can be reduced.

Figure 16:
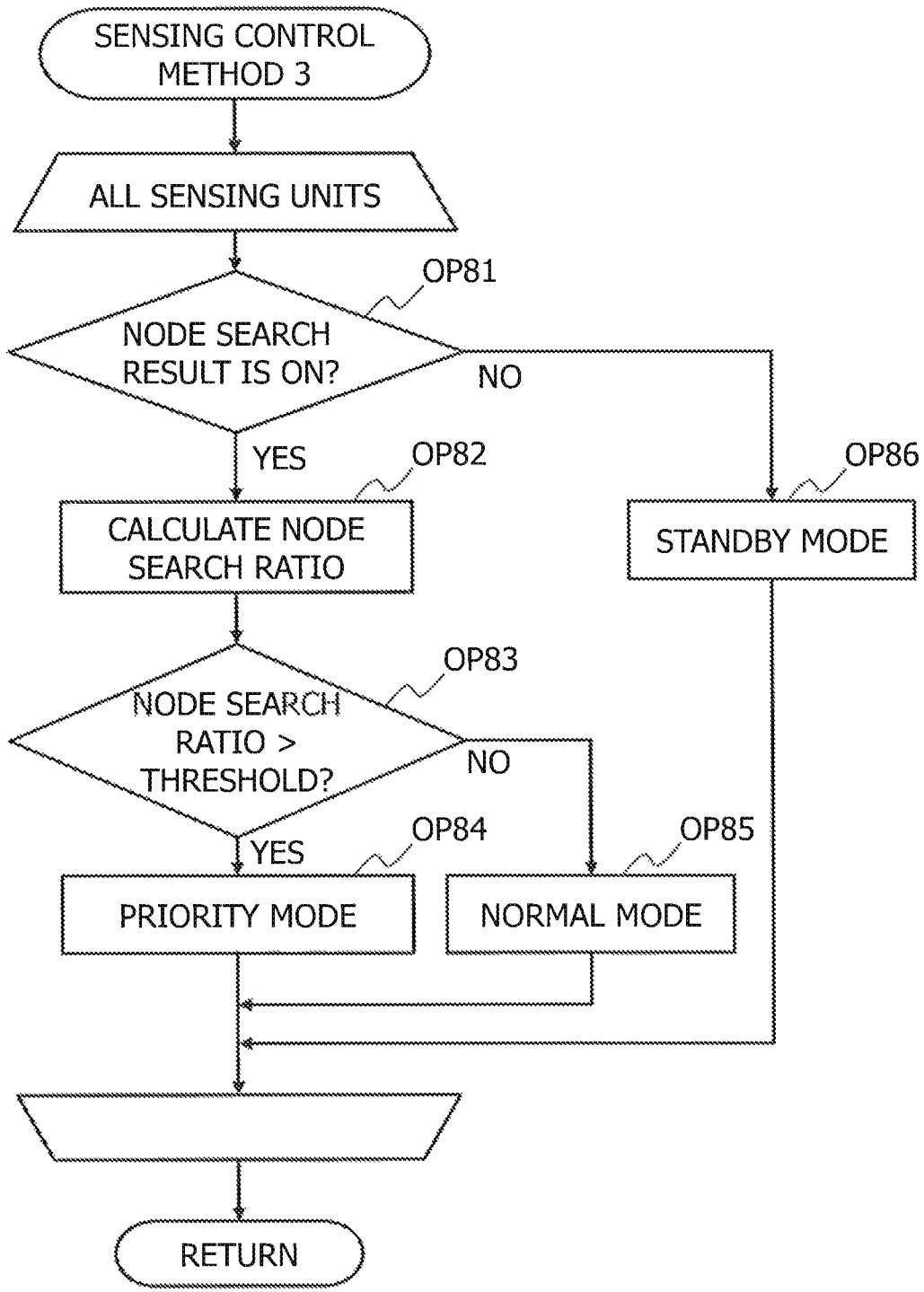
FIG. 16 is an example of a flowchart of method 3 for the sensing control process to be performed according to a result of the node search process.

FIG. 16 is an example of a flowchart of method 3 for the sensing control process to be performed according to a result of the node search process. In method 3, the operating mode of each sensing unit 26 is determined depending on the proportion of searches of a node as a corresponding event.

Processes in OP81 to OP86 are executed for all sensing units 26 of the mobile terminal 2. In OP81, the sensing control unit 21 determines whether the sensing unit 26 as a processing object is determined to be turn-on as a result of the node search process.

If the sensing unit 26 as the processing object is determined to be turn-on by the node search process (OP81:YES), the process advances to OP82. In OP82, the sensing control unit 21 calculates a node search ratio for the sensing unit 26 as the processing object.

A node search ratio is a value obtained by dividing the number of searches for the sensing unit 26 as a processing object in the node search process by the total number of searches for all the sensing units 26. A node search ratio indicates the degree of event occurrence detected by each sensing unit 26. The number of searches for each sensing unit 26 is counted in the node search process, for example, in the process in OP64 of FIG. 14. The process then advances to OP83.

In OP83, the sensing control unit 21 determines whether the calculated node search ratio for the sensing unit 26 as the processing object is larger than a predetermined threshold. The threshold is used to determine the operating mode of the sensing unit 26 as the processing object as priority mode or normal mode and has a value of, for example, 0 to 1. If the node search ratio for the sensing unit 26 as the processing object is larger than the predetermined threshold (OP83:YES), the process advances to OP84. In OP84, the sensing control unit 21 sets the operating mode of the sensing unit 26 as the processing object to priority mode. If the node search ratio for the sensing unit 26 as the processing object is equal to or less than the predetermined threshold (OP83:NO), the process advances to OP85. In OP85, the sensing control unit 21 sets the operating mode of the sensing unit 26 as the processing object to normal mode.

If the sensing unit 26 as the processing object is not determined to be turn-on by the node search process (OP81:NO), the process advances to OP86. In OP86, the sensing control unit 21 sets the operating mode of the sensing unit 26 as the processing object to standby mode.

When the process in OP84, OP85, or OP86 ends, processing is repeated for the next sensing unit 26 from OP81. If the sensing unit 26 as the processing object is a last sensing unit, the process illustrated in FIG. 16 ends.

In the case of method 3, the operating mode is determined according to the level of the node search ratio for the sensing unit 26 as the processing object. A node search ratio indicates the degree of event occurrence detected by each sensing unit 26. According to method 3, the sensing unit 26 with a high probability of event occurrence can be made to operate in priority mode.

Although a node search ratio is calculated using the number of searches for each sensing unit 26 in the node search process in method 3, a node search ratio may be calculated using the number of logs generated for each arc in the first arc table. For example, in OP64 of FIG. 14, the number of searches for the sensing unit 26 for a processing object node is counted by adding the number of logs generated in the first arc table for an arc connecting the processing object node and a node at immediately smaller depth to the number of searches for the sensing unit 26. A node search ratio is calculated using the number of searches. As described above, a search ratio for each sensing unit 26 can be calculated through weighting with the number of logs generated for an arc.

Figure 17:
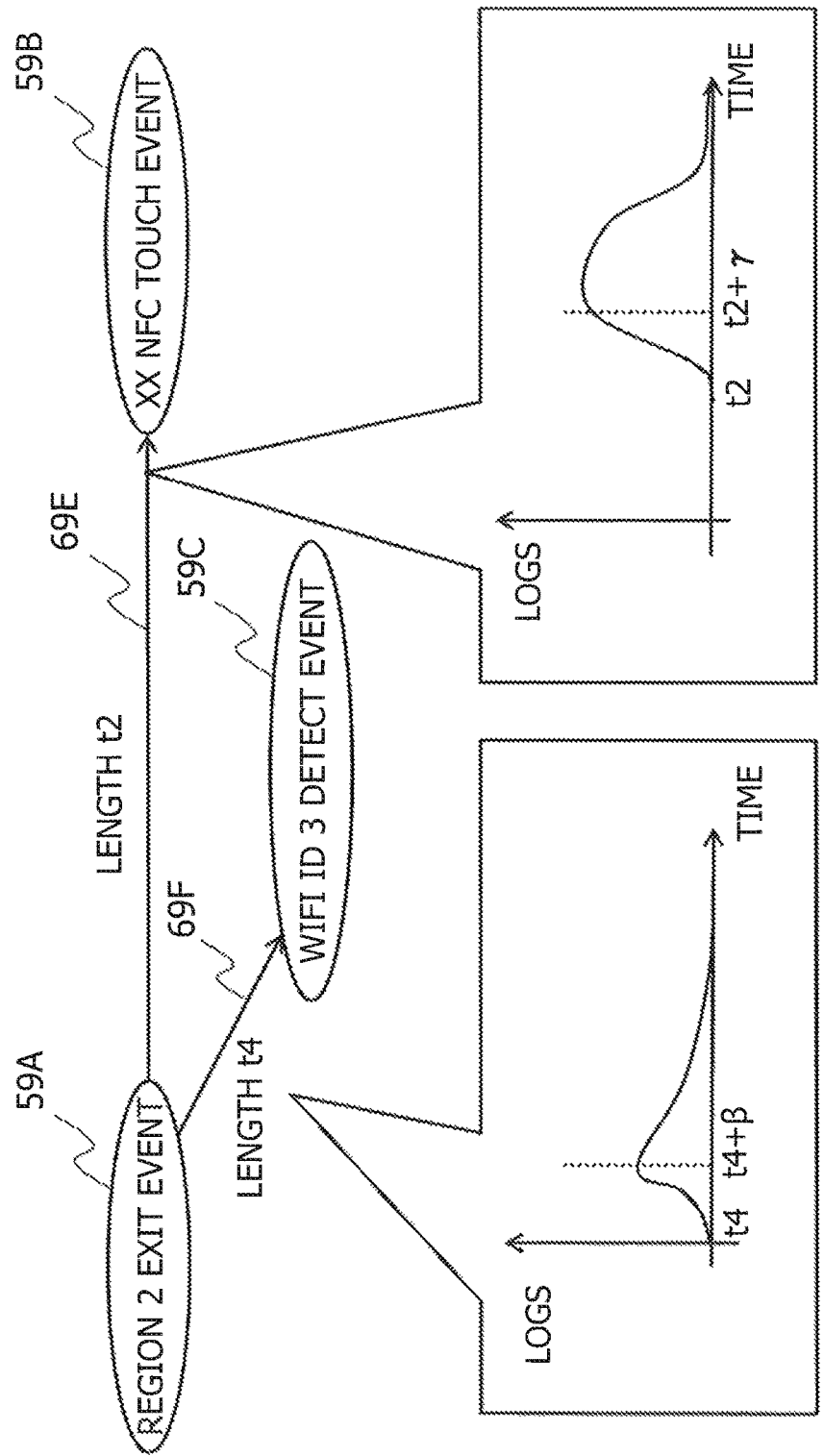
FIG. 17 is an example of a diagram illustrating method 4 for the sensing control process to be performed according to a result of the node search process.

FIG. 17 is an example of a diagram illustrating method 4 for the sensing control process to be performed according to a result of the node search process. Method 4 is a method for setting the operating mode of the sensing unit 26 according to a distribution of event occurrence interval (a distribution of arc length).

In the directed graph illustrated in FIG. 17, a node 59B is connected to an origin node 59A by an arc 69E. An node 59C is connected to the origin node 59A by an arc 69F.

Since a time period as a shortest event occurrence interval among event histories is held as an arc length in the first arc table, an arc length is a shortest event interval among histories in a directed graph created by the mobile terminal 2. However, an occurrence interval for an event as a node actually has a distribution.

For example, there is a history of earliest occurrence of the node 59C after a lapse of t4 since occurrence of the origin node 59A. The number of logs generated is at its peak at a time after a lapse of β since t4. For example, there is a history of earliest occurrence of the node 59B after a lapse of t2 since occurrence of the origin node 59A. The number of logs generated is at its peak at a time after a lapse of γ since t2.

Thus, method 4 takes into account a distribution of the number of logs generated among time ranges of a predetermined unit. The operating mode of the sensing unit 26 is set to normal mode within a time range with a small number of logs generated while the operating mode of the sensing unit 26 is set to priority mode within a time range with a large number of logs generated. The time ranges of the predetermined unit are time ranges of a unit, such as 1 minute, 5 minutes, or 10 minutes. A distribution by time of the number of logs generated is held in the second arc table (see FIG. 7). In FIG. 7, a distribution of log occurrence among time ranges of 5 minutes is held.

Figure 18:
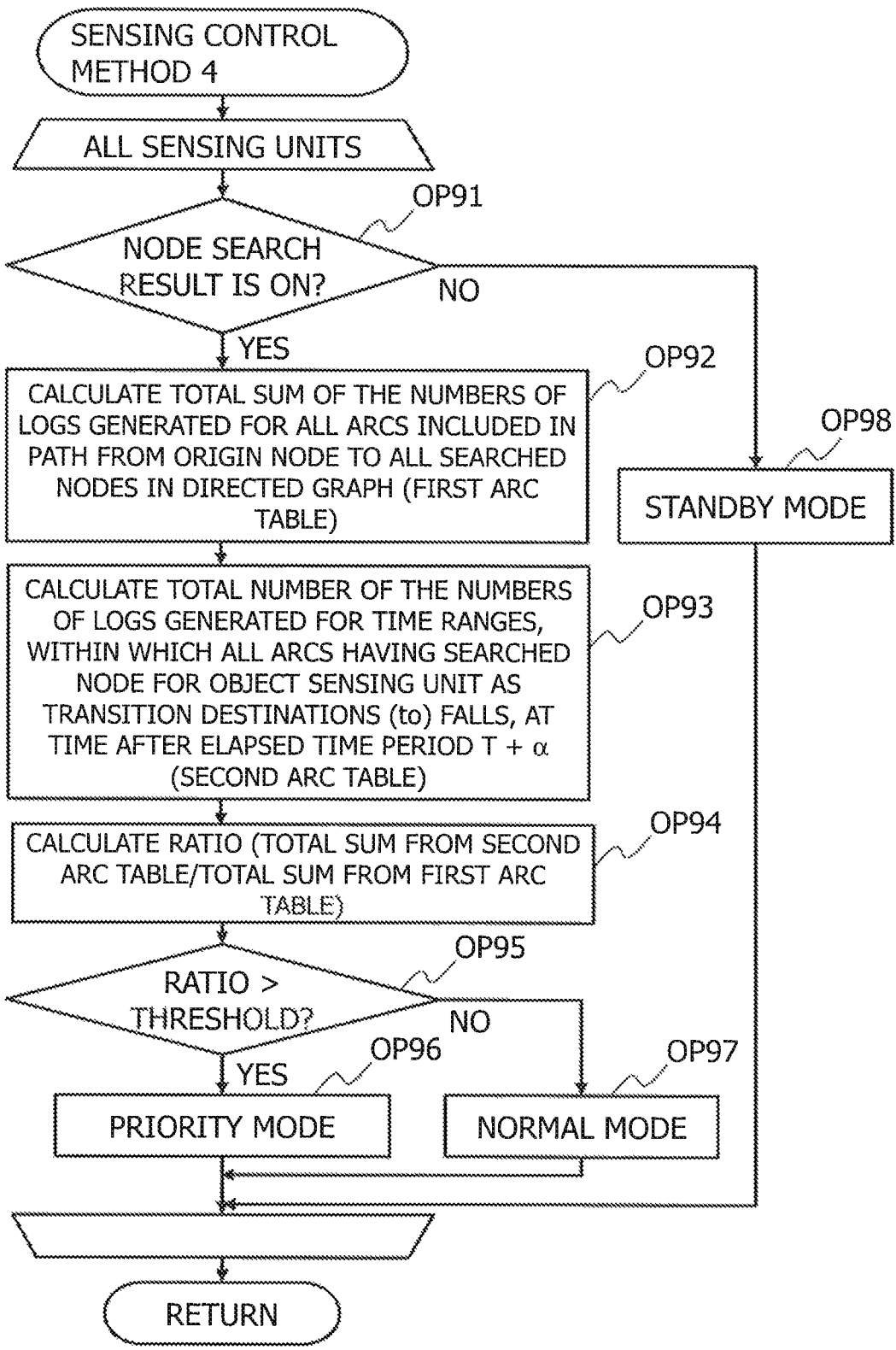
FIG. 18 is an example of a flowchart of method 4 for the sensing control process to be performed according to a result of the node search process.

FIG. 18 is an example of a flowchart of method 4 for the sensing control process to be performed according to a result of the node search process.

Processes in OP91 to OP98 are executed for all sensing units 26 of the mobile terminal 2. In OP91, the sensing control unit 21 determines whether the sensing unit 26 as a processing object is determined to be turn-on as a result of the node search process.

If the sensing unit 26 as the processing object is determined to be turn-on by the node search process (OP91: YES), the process advances to OP92. In OP92, the sensing control unit 21 calculates, from the first arc table, the total sum of the numbers of logs generated for all arcs included in a transition process from an origin node to nodes which have already undergone a node search in a directed graph at a time after the elapsed time period T+α. The process advances to OP93.

In OP93, the sensing control unit 21 calculates, from the second arc table, the total sum of the numbers of logs generated for time ranges, within which arcs having the node that has already undergone a node search for the sensing unit 26 as the processing object in the directed graph as a transition destination ("Node ID (to)" in the first arc table) falls. A time range, within which an arc in question falls, is a time range defined in the second arc table, within which a time period, obtained by subtracting the sum of arcs including the arc in question which are included in a transition process from the origin node to the transition destination node of the arc in question from the elapsed time period T+α, falls. The process then advances to OP94.

In OP94, the sensing control unit 21 calculates a ratio obtained by dividing the total sum calculated from the second arc table in OP93 by the total sum calculated from the first arc table in OP92. The ratio indicates the proportion of use of the sensing unit 26 as the processing object is used at a time after the elapsed time period T+α in the directed graph. The process then advances to OP95.

In OP95, the sensing control unit 21 determines whether the calculated ratio for the sensing unit 26 as the processing object is more than a predetermined threshold. The threshold is used to determine the operating mode of the sensing unit 26 as the processing object as priority mode or normal mode. If the ratio for the sensing unit 26 as the processing object is more than the predetermined threshold (OP95:YES), the process advances to OP96. In OP96, the sensing control unit 21 sets the operating mode of the sensing unit 26 as the processing object to priority mode. If the ratio for the sensing unit 26 as the processing object is equal to or less than the predetermined threshold (OP95:NO), the process advances to OP97. In OP97, the sensing control unit 21 sets the operating mode of the sensing unit 26 as the processing object to normal mode.

If the sensing unit 26 as the processing object is not determined to be targeted for turn-on by the node search process (OP91:NO), the process advances to OP98. In OP98, the sensing control unit 21 sets the operating mode of the sensing unit 26 as the processing object to standby mode.

When the process in OP96, OP97, or OP98 ends, processing is repeated for the next sensing unit 26 from OP91. If the sensing unit 26 as the processing object is a last sensing unit, the process illustrated in FIG. 18 ends.

In the case of method 4, the operating mode is determined according to the level of the proportion of use of the sensing unit 26 as the processing object at the time after the elapsed time period T+α. A time period from a predetermined event to occurrence of a next event, i.e., an event occurrence interval has a distribution, and the possibility of event occurrence changes with time. That is, the proportion of use of the sensing unit 26 changes with an elapsed time period. According to method 4, the sensing unit 26 that detects an event is operating in priority mode in a time range, within which the event is highly likely to occur, which allows detection of an event with higher accuracy. The sensing unit 26 that detects an event is operating in normal mode in a time range, within which the event is unlikely to occur, which allows a reduction in consumed power.

<Application>

Examples of the sensing control processing described in the first embodiment include a service which delivers a piece of shop information or a piece of selling space information corresponding to an area in a shopping center to a customer and a service which assists shopping area staff in the work in each area and checking affairs.

Figure 19:
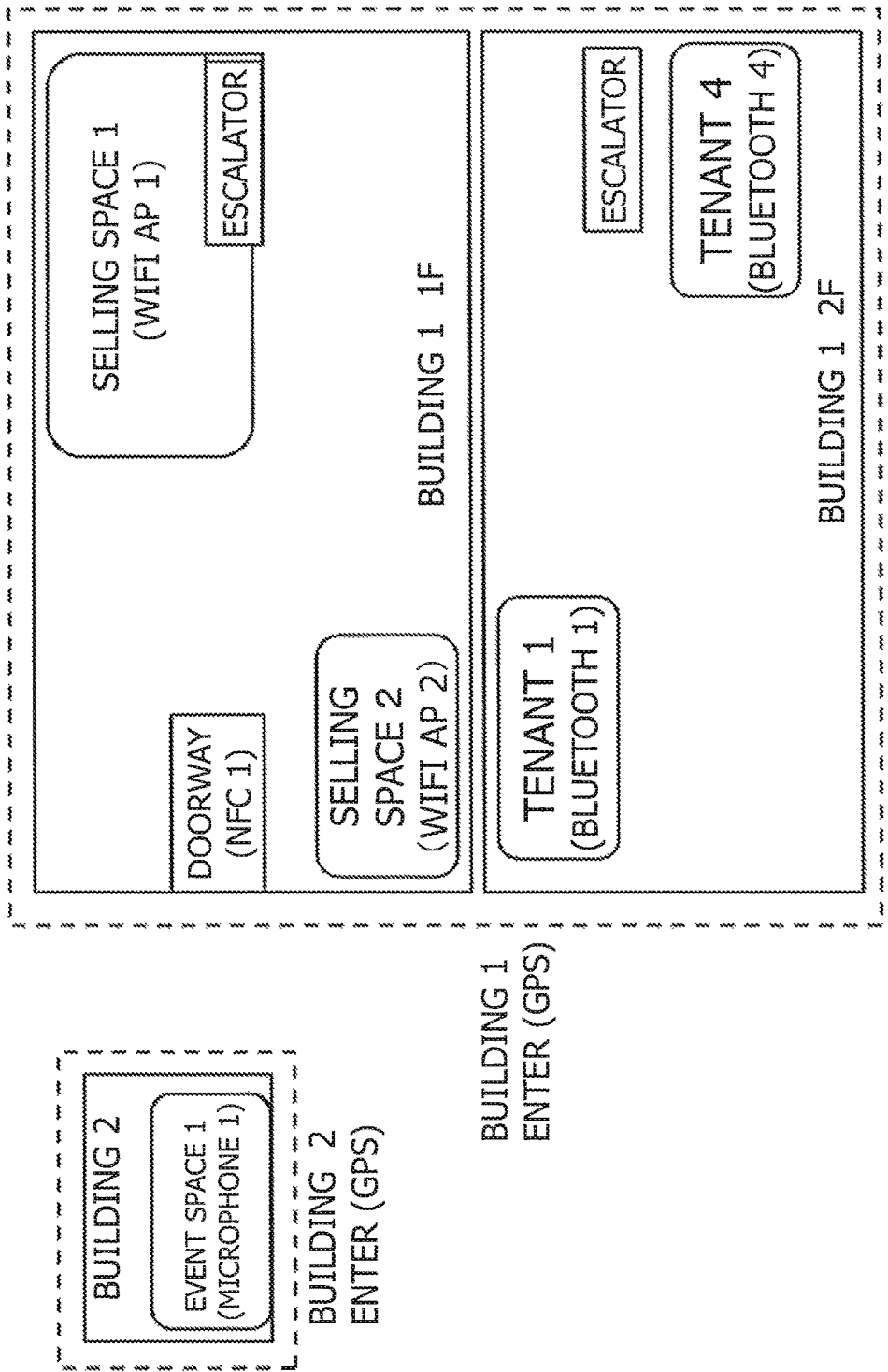
FIG. 19 is an example of a diagram illustrating a locational relation in a shopping center.

FIG. 19 is a diagram illustrating an example of a positional relation in a shopping center. In the example illustrated in FIG. 19, building 1 and building 2 are present in the shopping center. Building 1 and building 2 are regions which are directly perceived by the GPS sensing unit 26C. A GPS can detect a location outdoors in a site for the shopping center.

At a doorway to building 1, NFC 1 is installed for point addition for a user. A user who desires point addition brings the mobile terminal 2 into contact with NFC 1 or close to a predetermined distance of NFC 1. A place ID linked to Wi-Fi access point 1 is defined for selling space 1 on the first floor of building 1. A place ID linked to Wi-Fi access point 2 is defined for selling space 2 on the first floor of building 1.

A place ID linked to Bluetooth device 1 is defined for tenant 1 on the second floor of building 1. A place ID linked to Bluetooth device 4 is defined for tenant 4 on the second floor of building 1. A place ID linked to sound wave signal output device 1 that outputs a sound wave signal outside an audible range is defined for event space 1 of building 2.

Note that the example illustrated in FIG. 19 is assumed such that absolute coordinates of Wi-Fi access points 1 and 2, NFC 1, Bluetooth devices 1 and 4, and sound wave output device 1 are not managed and such that a positional relation among the components is systematically unknown.

FIGS. 20A, 20B, 20C, and 20D are an example of a diagram illustrating a directed graph created in sensing control according to the first embodiment. The directed graphs illustrated in FIGS. 20A-20D are created from pieces of event history data by the server 1. Assume that the mobile terminal 2 includes the sensing units 26 capable of detecting Wi-Fi access points 1 and 2, NFC 1, Bluetooth devices 1 and 4, and sound wave output device 1.

Figure 20A:
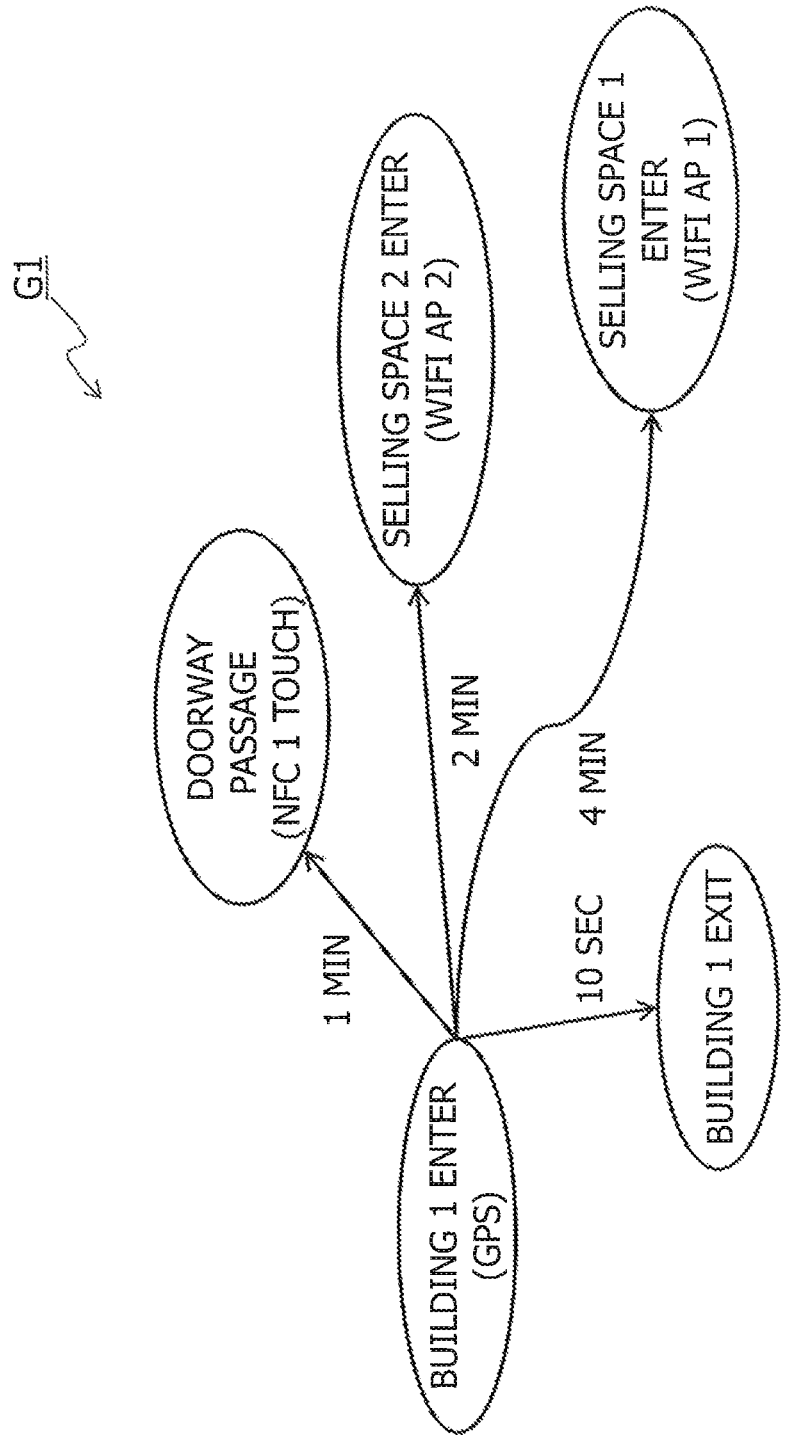
FIG. 20A is an example of a diagram illustrating a directed graph to be created in sensing control according to the first embodiment.

For example, in a directed graph G1 in FIG. 20A, an event node as an origin node is coupled to a doorway passage event node by an arc of a length of 1 minute. In the directed graph G1, a building 1 enter event node is coupled to a selling space 2 enter event node by an arc of a length of 2 minutes, is coupled to a selling space 1 enter event node by an arc of a length of 4 minutes, and is coupled to a building 1 exit event node by an arc of a length of 10 seconds.

For example, in a directed graph G2 in FIG. 20B, the doorway passage event node as an origin node is coupled to the selling space 2 enter event node by an arc of a length of 1 minute and is coupled to the selling space 1 enter event node by an arc of a length of 3 minutes.

For example, in a directed graph G3 in FIG. 20C, a selling space 1 exit event node as an origin node is coupled to the building 1 exit event node by an arc of a length of 4 minutes, is coupled to a tenant 4 enter event node by an arc of a length of 2 minutes, is coupled to a tenant 1 enter event node by an arc of a length of 6 minutes, and is coupled to the selling space 2 enter event node by an arc of a length of 2 minutes.

For example, in a directed graph G4 in FIG. 20D, the selling space 1 enter event node as an origin event is coupled to the selling space 1 exit event node by an arc of a length of 10 second.

If sensing control is performed by method 4, the sensing control is performed in the manner below. Note that each sensing unit will simply be called by type in the description below, for the sake of convenience.

Upon occurrence of a building 1 enter event (T=0), the directed graph G1 is produced, a node search is performs in the directed graph G1. Assuming that an offset time period for the elapsed time period is 1 minute(=α), NFC for the doorway passage event node and GPS for the building 1 exit event node, arc lengths of which are equal to or less than T+α(=1 minute), operate in priority mode upon occurrence of the building 1 enter event (T=0). The other sensing units 26 operate in standby mode. If the second arc table records that the number of logs generated for a doorway passage event decreases with time, NFC transits in operating mode from priority mode to normal mode as time passes.

When the elapsed time period reaches 1 minute without detection of any new event, Wi-Fi for the selling space 2 enter event node, an arc length of which is equal to or less than T+α(=2 minutes), also comes to operate in priority mode.

If a selling space 1 exit event is detected, after a lapse of 1 minute (the elapsed time period T=1 minute), Bluetooth for the tenant 4 enter event node and Wi-Fi for the selling space 2 enter event node, arc lengths of which are equal to or less than the elapsed time period T+α(=2 minutes), come to operate in priority mode or normal mode. At this time, GPS operates in standby mode without a node search. After a further lapse of 2 minutes (the elapsed time period T=3 minutes), GPS for the building 1 exit event node, an arc length of which is equal to or less than the elapsed time period T+α(=4 minutes), comes to operate in priority mode or normal mode.

For example, if the operation interval for priority mode is set to 10 seconds, that for normal mode is set to 1 minute, and that for standby mode is set to 3 minutes, the number of operations in priority mode is six times that in normal mode and 18 times that in standby mode. It is thus apparent that operation in standby mode of a plurality of sensing units 26 for 1 minute with the above-described control of the sensing units allows a reduction in the numbers of operations for all the sensing units 26 and achievement of power saving.

It can be seen through, for example, focusing on the directed graph G1 that an event node connected to the building 1 enter event node is an event node for a place included in the first floor of building 1 and that a geographical relation among places and a positional relation among nodes in the directed graph G1 are similar. In the first embodiment, an event occurs due to a movement of the mobile terminal 2, and an event occurrence interval is a movement time period between places. A movement time period is proportional to a distance between places with respect to a certain speed. Thus, creation of a directed graph with an event in a piece of event history data regarded as a node and an event occurrence interval regarded as an arc length allows detection of a rough positional relation among devices or places.

If a positional relation among places is defined using absolute coordinates, large-scale processing, such as measurement of radio field strength, is performed, and preparation needs labor and a cost, such as an estimated cost. In contrast, in the sensing control system according to the first embodiment, a rough positional relation can be acquired by relatively low-cost processing, such as association of a place ID with the ID of a device, and a service using the positional relation can be provided.

<Operation and Effect of First Embodiment>

According to the first embodiment, the mobile terminal 2 produces, based on pieces of event history data, a directed graph using an event as a node, an event occurrence interval as an arc length, and a latest event as an origin node. The mobile terminal 2 extracts a node according to an elapsed time period since occurrence of the latest event and the total of arc lengths and selects a sensing unit that detects the extracted node. The mobile terminal 2 turns on the selected sensing unit or sets the selected sensing unit to priority mode or normal mode and turns off unselected sensing units or sets the unselected sensing units to standby mode. This allows a reduction in the number of sensing units 26 running in parallel or the numbers of operations for the sensing units 26 and a reduction in power consumed by a plurality of sensing units 26.

According to the first embodiment, the mobile terminal 2 can acquire a rough positional relation called a directed graph based on a piece of information on the association of a device with a range of detection (a place) of the device without retaining as absolute coordinates pieces of information, such as the current location of the mobile terminal 2 itself, the locations of devices, and a range of detection (a place) of each device. The mobile terminal 2 can also select the sensing unit 26 for an event highly like to occur next using the directed graph indicating the rough positional relation to perform control. With this configuration, if sensing is desired, the mobile terminal 2 performs the desired sensing, which allows a reduction in consumed power.

Note that although the server 1 collects pieces of event history data from each mobile terminal 2 and creates a piece of directed graph data in the first embodiment, the present invention is not limited to this. For example, the mobile terminal 2 may include the data creation unit 12 of the server 1, and the mobile terminal 2 alone may create a piece of directed graph with a latest event as an origin from pieces of event history data for the mobile terminal 2 itself and control the sensing unit 26.

A portable type information processing apparatus, an information processing system, and an information processing method of the disclosure can reduce power consumed by a plurality of sensing units.

One of other aspects of the present invention is an information processing method to be executed by the above-described portable type information processing apparatus. The other aspects of the present invention can also include an information processing program for causing a computer to function as the portable type information processing apparatus and a computer-readable recording medium having recorded thereon the program. A recording medium readable by a computer or the like refers to a recording medium on which information, such as data or a program, can be accumulated by electrical, magnetic, optical, mechanical, or chemical action and from which the information can be read by a computer or the like.

All examples and conditional language provided herein are intended for the pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiment(s) of the present invention have been described in detail, it should be understood that the various changes, substitutions, and alterations could be made hereto without departing from the spirit and scope of the invention.

What is claimed is:

1. A portable type information processing apparatus comprising:
a plurality of sensing units that acquire information convertible into place information indicating a current location of the portable type information processing apparatus and detect an event which occurs in relation to the place information obtained through conversion from the information;
a storage unit that stores event transition information indicating a relation between order of transitions between events acquired by the plurality of sensing units and transition time periods spent on the transitions; and
a control unit that obtains, as a current event, a latest event detected by any one of the plurality of sensing units and controls an operating state of a sensing unit to detect a transition destination event of an event corresponding to the current event in the event transition information based on a relation between a transition time period spent on a transition from the event corresponding to the current event to the transition destination event in the event transition information and an elapsed time period since detection of the current event,
wherein the control unit performs an acquisition of an event transition with the latest event as an origin based on the event transition information, an extraction of one or more first events, a total transition time period from the origin of which is less than the elapsed time period, a selection of one or more first sensing units detecting the one or more first events in the event transition information, and a control of the plurality of sensing units that turns off one or more second sensing units which are unselected or makes an operation interval for each of the one or more second sensing units longer than an operation interval for each of the one or more first sensing units.

2. The portable type information processing apparatus according to claim 1,
wherein the control unit repeatedly executes, with predetermined frequency, the extraction of the event and the control of the plurality of sensing units until a new event is detected by any one of the plurality of sensing units.

3. The portable type information processing apparatus according to claim 1,
wherein when absolute coordinates are acquired by one of the plurality of sensing units, and a current location obtained from the absolute coordinates is within a predetermined region, in a state where no event is detected, the control unit sets as the origin a stay event indicating a stay within the predetermined region in the event transition information.

4. The portable type information processing apparatus according to claim 3,
wherein when the current location is within a plurality of regions, the control unit sets as the origin a stay event indicating a stay within a region, a boundary of which is closest to the current location.

5. The portable type information processing apparatus according to claim 1,
wherein when absolute coordinates are acquired by one of the plurality of sensing units, and a current location obtained from the absolute coordinates is within no region, in a state where no event is detected, the control unit sets as the origin an exit event indicating an exit from a region, a boundary of which is closest to the current location.

6. The portable type information processing apparatus according to claim 1, further comprising
a second storage unit that stores an event detection ratio for each of the plurality of sensing units,
wherein when the plurality of sensing units do not include a sensing unit capable of acquiring absolute coordinates, the control unit determines an operation interval for each of the sensing units according to the event detection rate for the sensing unit obtained from the second storage unit in a state where no event is detected.

7. The portable type information processing apparatus according to claim 1,
wherein the control unit calculates, for each of the one or more first sensing units, probability of use based on the one or more first events and determines an operation interval according to the probability of use.

8. The portable type information processing apparatus according to claim 7,
wherein the control unit calculates, as the probability of use for each of the one or more first sensing units, proportion of a total number of first events detected by the each of the one or more first sensing units to a total number of the one or more first event.

9. The portable type information processing apparatus according to claim 7,
wherein the event transition information includes the numbers of logs generated for the transitions between the events acquired by the plurality of sensing units, and
the control unit weights each of the one or more first events according to the number of logs of transitions between the latest event and the one or more first events based on the event transition information, weights a first total number of the one or more first event and second total numbers of first event detected by the each of the one or more first event based on weights for the one or more first events, and calculates, as the probability of use for each of the one or more first sensing units, proportion of a weighted value of a second total number to a weighted value of the first total number.

10. The portable type information processing apparatus according to claim 1,
wherein the event transition information includes the number of logs of each of the transitions between the events acquired by the plurality of sensing units and a distribution of a transition time period for the each of the transitions between the events, and
the control unit calculates, for each of the one or more first sensing unit, proportion of a first number of logs to a second number of logs, the first number of logs of transitions of which transition destinations are first events detected by a first sensing unit in a time range corresponding to the elapsed time period in the distribution, and the second number logs of transitions included in the event transitions between the latest event and the one or more first events, and determines an operation interval according to the proportion.

11. An information processing system comprising
a plurality of portable type information processing apparatuses and a server, the plurality of portable type information processing apparatuses including a plurality of sensing units that acquire information convertible into place information indicating a current location of the portable type information processing apparatus and detect an event occurring in relation to the place information obtained through conversion from the information, wherein the server includes a reception unit that receives history information on an event detected by the plurality of portable type information processing apparatuses, a generation unit that compiles the history information and generates event transition information indicating a relation between order of transitions between events acquired by the plurality of sensing units and transition time periods spent on the transitions, and a transmission unit that transmits the event transition information to the plurality of portable type information processing apparatuses, and the plurality of portable type information processing apparatuses each include a reception unit that receives the event transition information, a storage unit that stores the event transition information, and a control unit that obtains, as a current event, a latest event detected by any one of the plurality of sensing units and controls an operating state of a sensing unit to detect a transition destination event of an event corresponding to the current event in the event transition information based on a relation between a transition time period spent on a transition from the event corresponding to the current event to the transition destination event in the event transition information and an elapsed time period since detection of the current event, wherein, the control unit of the portable type information processing apparatus performs an acquisition of an event transition with the latest event as an origin based on the event transition information, an extraction of one or more first events, a total transition time period from the origin of which is less than the elapsed time period, a selection of one or more first sensing units detecting the one or more first events in the event transition information, and a control of the plurality of sensing units that turns off one or more second sensing units which are unselected or makes an operation interval for each of the one or more second sensing units longer than an operation interval for each of the one or more first sensing units.

12. The information processing system according to claim 11, wherein the control unit of the portable type information processing apparatus calculates, for each of the one or more first sensing units, proportion of a total number of first events detected by the each of the one or more first sensing units to a total number of the one or more first event and determines an operation interval according to the proportion.

13. The information processing system according to claim 11, wherein the generation unit of the server compiles the numbers of logs generated for the transitions between the events acquired by the plurality of sensing units in the log information and includes a compilation in the event transition information, and the control unit of the portable type information processing apparatus weights each of the one or more first events according to the number of logs of transitions between the latest event and the one or more first events based on the event transition information, weights a first total number of the one or more first event and second total numbers of first event detected by the each of the one or more first event based on weights for the one or more first events, and calculates, as the probability of use for each of the one or more first sensing units, proportion of a weighted value of a second total number to a weighted value of the first total number.

14. The information processing system according to claim 11, wherein the generation unit of the server compiles the number of logs of each of the transitions between the events acquired by the plurality of sensing units and a distribution of a transition time period for the each of the transitions between the events in the log information and includes a compilation in the event transition information, and the control unit calculates, for each of the one or more first sensing unit, proportion of a first number of logs to a second number of logs, the first number of logs of transitions of which transition destinations are first events detected by a first sensing unit in a time range corresponding to the elapsed time period in the distribution, and the second number logs of transitions included in the event transitions between the latest event and the one or more first events, and determines an operation interval according to the proportion.

15. An information processing method for a portable type information processing apparatus including a plurality of sensing units that acquire information convertible into place information indicating a current location of the portable type information processing apparatus and detect an event which occurs in relation to the place information obtained through conversion from the information, comprising:

storing event transition information indicating a relation between order of transitions between events acquired by the plurality of sensing units and transition time periods spent on the transitions; and obtaining, as a current event, a latest event detected by any one of the plurality of sensing units and controlling an operating state of a sensing unit configured to detect a a transition destination event of an event corresponding to the current event in the event transition information based on a relation between a transition time period spent on a transition from the event corresponding to the current event to the transition destination event in of event transition information and an elapsed time period since detection of the current event, wherein the obtaining performs an acquisition of an event transition with the latest event as an origin based on the event transition information, an extraction of one or more first events, a total transition time period from the origin of which is less than the elapsed time period, a selection of one or more first sensing units detecting the one or more first events in the event transition information, and a control of the plurality of sensing units that turns off one or more second sensing units which are unselected or makes an operation interval for each of the one or more second sensing units longer than an operation interval for each of the one or more first sensing units.

* * * * *